(12) United States Patent
Smaltz

(10) Patent No.: US 8,307,288 B1
(45) Date of Patent: Nov. 6, 2012

(54) ACTIVE FORMS CONTENT DELIVERY SERVICE FOR ENTITES AND MOBILE NETWORKED DEVICE USERS (ACTIVE FORMS)

(76) Inventor: David Gene Smaltz, Peabody, MA (US)

( * ) Notice: Subject to any disclaimer, the term of this patent is extended or adjusted under 35 U.S.C. 154(b) by 1019 days.

(21) Appl. No.: 12/100,353

(22) Filed: Apr. 9, 2008

Related U.S. Application Data

(63) Continuation-in-part of application No. 11/949,037, filed on Dec. 2, 2007.

(60) Provisional application No. 60/872,898, filed on Dec. 5, 2006, provisional application No. 60/922,751, filed on Apr. 10, 2007.

(51) Int. Cl.
*G06Q 30/00* (2006.01)
*H04B 7/00* (2006.01)
*H04J 3/16* (2006.01)

(52) U.S. Cl. ........ 715/733; 455/418; 709/231; 715/741; 705/14.48; 705/14.57; 705/14.58; 705/14.64

(58) Field of Classification Search .................. 715/733, 715/741; 455/418; 709/231; 705/14.48, 705/14.57, 14.58, 14.64
See application file for complete search history.

(56) References Cited

U.S. PATENT DOCUMENTS

| | | | | |
|---|---|---|---|---|
| 6,779,042 B1 * | 8/2004 | Kloba et al. | ................ | 709/248 |
| 7,200,387 B1 * | 4/2007 | Ephraim et al. | ............. | 455/418 |
| 7,266,383 B2 * | 9/2007 | Anderson | .................. | 455/518 |
| 7,457,312 B2 * | 11/2008 | Weiss et al. | .................. | 370/468 |
| 2002/0013809 A1 * | 1/2002 | Hashimoto et al. | ........... | 709/203 |
| 2005/0021953 A1 * | 1/2005 | Trommler | ..................... | 713/166 |
| 2006/0036493 A1 * | 2/2006 | Aufricht et al. | .................. | 705/14 |
| 2007/0162341 A1 * | 7/2007 | McConnell et al. | ............ | 705/14 |
| 2007/0262996 A1 * | 11/2007 | Fernandez et al. | ............ | 345/473 |

OTHER PUBLICATIONS

Bae et al., Design and Evaluation of a hierarchical service management method using bloom filters for large MANETs, Oct. 2008, WiCom 08, pp. 1-5.*
Y. Horry, et al., A passive-style buttonless mobile terminal, Aug. 2003, IEEE Transactions on Consumer Electronics vol. 49,Iss.3.*

* cited by examiner

*Primary Examiner* — Jordany Nunez
(74) *Attorney, Agent, or Firm* — Wiggin and Dana LLP

(57) ABSTRACT

Capability to present forms, items and menu commands behavior, which translates to other languages, in combination with network communication and a user interface event listener, is compiled into binary code (Step 1), loaded (Step 2) and run (Step 3) on a mobile networked device. Such capability includes at least one of placement, appearance, behavior, logic, format, user interaction behavior, input validation and video. Instructions, not characterized as compiled code, browser pages or scripting language, are assembled and stored on a server. The running binary code on the mobile networked device requests and receives the instructions (Step 4) which trigger the capability code to present variable format and information (Step 5). New retrieved instructions trigger different capability code to present different variable format and information without recompiling and downloading code to the mobile networked device (Step 6), thus providing an efficient portable service for entities and users of mobile networked devices.

25 Claims, 17 Drawing Sheets

ACTIVE FORMS CONTENT DELIVERY SERVICE FOR ENTITES AND MOBILE NETWORKED DEVICE USERS (ACTIVE FORMS)

This application is a continuation-in-part of application Ser. No. 11/949,037 filed on Dec. 2, 2007, which claims priority from provisional patent application Ser. 60/872,898 filed on Dec. 5, 2006.

This application also claims priority under 35 U.S.C. §119 (e) from provisional application Ser. No. 60/922,751 filed on Apr. 10, 2007.

BACKGROUND OF THE INVENTION

1. Field of the Invention

The invention relates to apparatus, methods, etc. used for mobile telecommunications. More particularly, it relates to those apparatus and methods in which information, advertising and other content are retrieved over a mobile network from the Internet and then organized and presented on mobile networked devices as a service for entities and mobile networked device users to view and interact with the information and then send data related to the interaction back to the remote web application servers to affect change to the relationship between the entity and user.

2. Background Art

Voice communications has been the primary service provided by mobile network operators. Capabilities for providing mobile data communication services, however, are now being deployed on a relatively widespread basis and are expected by many to represent a significant area of growth in the years ahead. Providing applications for use on mobile networked devices is one significant area of mobile data services. Such applications will most certainly include those that enable users to affect change in their relationship with entities that touch their lives such as banking and finance, health care, education, dining, entertainment, and social clubs. Today, much of this is handled over the Internet from the desktop browser, but more and more will be done over mobile networked devices. This will require efficient methods and techniques for displaying the same information on the screen of the mobile networked device.

Different strategies for providing such applications have emerged. Much of the initial development focused on server-side execution of applications in which most of the processing power resides in the network operator's, or a third party's, servers. This strategy was employed, for example, by the wireless application protocol (WAP), which uses WAP browsers to receive and display content and applications that are generated by remote servers. User responses are then sent back through the network to the remote servers for processing and any further actions. Thus, there can be significant delays as information and display formatting is sent back and forth between the mobile networked device and the remote server.

As processors have become smaller and cheaper, along with cheaper and more compact memories, it has become more feasible to increase the processing power on the mobile networked device which enables applications to be implemented locally on the mobile networked device. Sun Microsystems's Java technology, which is implemented on mobile networked devices as J2ME, offers one possible way of implementing applications on mobile networked devices which is described in further detail at http://www.java.sun.com; Qualcomm has developed the Binary Runtime Environment for Wireless (BREW) platform, which is described in further detail at http://www.qualcomm.com/brew; Flash Lite has been implemented for development of applications, with more information at http://www.adobe.com/products/flashlite; Microsoft has implemented Windows Mobile for mobile networked devices; and finally Google has announced the launch of its own mobile networked device with a proprietary operating system and the Android Software Developer Kit for developers using Java. Moreover, all of these technologies enable applications to be downloaded over the air and stored locally on a mobile networked device.

BRIEF DESCRIPTION OF TERMS

Underlying Programming Language of Implementation—The invention abstracts forms, items and menu commands as a set of instructions stored on a web server. The invention uses one of the various programming languages mentioned in this specification to retrieve the instructions and create form, item and menu command objects to store the instructions. Utilizing the same programming language, the abstracted objects are used to instantiate similar visible objects in the programming language on the device. The specification has been implemented with Sun Java J2ME.

Form—A term used in the implementation on Sun Java J2ME to refer to an area on the mobile networked device screen for display of information. A form can occupy either a portion of the screen or the entire screen. Sun Java J2ME forms translate to similar objects in other programming languages.

Item—A term used in the implementation on Sun Java J2ME to refer to a display container for content on a form. Items can be for displaying text, numbers, formatted numbers such as currency, and lists for display of a series of information and images. Sun Java J2ME items translate to similar objects in other programming languages.

Menu command—At term used in the implementation on Sun Java J2ME to refer to application navigation menu items displayed on the mobile networked device screen which are used by the mobile networked device user to navigate to different forms and display areas in the application. Sun Java J2ME menu commands translate to similar objects in other programming languages.

Uniform Resource Locator or URL—is a global address of a resource located on a network such as the World Wide Web.

Web application server (WAS)—is compiled code which runs on a machine on a network which accepts connections and can send content and instructions to a mobile networked device or application on a device.

Entity—is a company or organization with members or customers with information that defines the relationship between the entity and the members or customers.

Entity Web application server (EWAS)—is a web application server maintained and controlled by an entity to accept connections from existing or potential members or customers and returns information regarding the relationship between the user and entity. Using the invention on a server, the EWAS would return Active Forms over the network.

Instructions—The delimited integers, characters and bitmasks that trigger the forms, items and menu command capabilities in the invention. For a form the instructions may include, but not be limited to, the URL address for the information to display, items, menu commands, layout and dimensions used to create the form.

Mobile networked device—A mobile networked device includes a processor, display screen, and possibly storage. The device is either physically connected to a network or connected to a network over the air using some type of mobile network technology, such as, but not limited to wireless cellular communication. Such mobility may be accomplished by a person carrying the device or the device being installed in some other component or larger mobile networked device.

Compiled Code—Translated source code from a high level programming language to a lower level language such as assembler or machine language. In the compiled state, the code is immutable and cannot be changed.

Listener—A set of programming logic that waits on user interface events. Events can be the user clicking a menu command, interacting with an item on a form or list. In the J2ME implementation, a listener is registered with each component with actions defined as a response to events.

There are also limitations

On desktop computer machines, applications can load new classes from external sources while the application is running to alter functionality or content presented to the user. This capability has been misused by developers and has resulted in a vast number of unwanted destructive viruses and adware being installed on desktop computers. Care was taken in writing standards for mobile networked devices to provide more security with what is called the "sandbox" model to prevent this from occurring on mobile networked devices. Mobile network application security is important to everyone involved in the industry, so the security on mobile networked devices is not likely to be loosened by carriers and software standards for the following reasons:

Mobile network carriers want to be sure that viruses do not bring down their customers' devices or their networks.

Device manufacturers don't want customer installed software crashing their devices.

Users want to download and run code without the fear that the code will take over their device or plant a virus or spywear on their device. Additionally, users want control over expensive network usage.

Application developers want to know that their applications will not be compromised by other applications.

And no one wants to have to install security software on their mobile networked device to prevent viruses and spywear.

The sandbox security on mobile networked devices limits applications to only the compiled code that was originally downloaded and installed by the user. While this security model prevents the devious attacks mentioned above, it also prevents the download of additional compiled code to make new functionality available to applications running on the devices. On most mobile platforms, applications are only allowed to download image, byte data, text files and video. Due to the sandbox, mobile networked device applications are tethered to the code initially downloaded by the user. The content in a form or ad can be change by downloading new images or content to present, but the appearance, layout and behavior of the form cannot be changed. To display another form that exhibits different behavior requires the download and installation of new compiled code or loading new pages in the browser on the mobile networked device, thus limiting the extent to which authors of such applications can alter the behavior while running on the mobile networked device.

There is also limited bandwidth available on some mobile networks where the download of only 100 kb during busy network times can cause the mobile networked device to appear frozen to the user. Even with the improvements to mobile networks, there are physical limitations that restrict network throughput. Mobile networked device users often incur charges for downloading new versions of applications and content over the mobile network and they resent charges for loading advertising content. Moreover, even if the mobile networked devices and network usage were to be offered free in exchange for downloaded advertising, users will resent the extra time it takes to download the ads.

The sandbox security on mobile networked devices limits applications to only the compiled code that was originally downloaded and installed by the user. While this security model prevents the devious attacks mentioned above, it also prevents the download of additional code to make new functionality available to applications running on the devices. On most mobile platforms, applications are only allowed to download image, byte data, text files and video. Due to the sandbox, the application and the layout of the content and information displayed is tethered to the code initially downloaded by the user. Information is displayed on the mobile networked device screen using static code which expects the information to arrive in a certain order. To exhibit different behavior or to display more information or in a different order requires the download and installation of new compiled code on the mobile networked device, thus limiting the extent to which behavior can be altered by the application.

From desktop browsers, users can visit sites of entities with which they have relationships to view information about their relationship or affect change to the relationship. The relationship users have with entities may include bank balances, health care information, bill payments or membership status. The large screen size of the desktop enables the display of large amounts of data using HTML to format the information and provide links to more information or forms for the user to interact with and potentially alter the relationship. Graphic images and colors are used to make the page attractive for the user to view and many entities display advertising with the information. The browser pages also can contain scripting languages such as JavaScript which are used to verify information before being sent to the EWAS. The advantage here is that the entity can make changes to the page on the EWAS to affect the appearance and content of the information without requiring the user to do anything.

The problem is that this paradigm is difficult to port to the mobile networked device. While a trimmed down version of HTML called WML and a scripting language called WMLScript is provided for the mobile networked devices, the screen size of the device limits what can be displayed and the addition of images and WMLScript code makes it slow to download over the limited bandwidth. Moreover, it is difficult for users to keep track of the large number of URL bookmarks on the mobile networked device that point to these pages.

Programming languages such as J2ME, Windows Mobile, Flash Lite, and BREW enable entities to program and compile applications which users can then download to the mobile networked device and run whenever they want to communicate with the entity. The advantage of using such applications is that the input validation code and images need to be downloaded only once and remain on the device, which means that less data has to be transferred over the air to the mobile networked device. However, the downloaded compiled code is limited by the security sandbox previously described: when the entity makes a change to the application, the user must download a new version of the compiled code. Moreover, this also leads to a plethora of application icons on the user's mobile networked device screen that makes navigation difficult and taxes memory and storage on the device.

SUMMARY OF THE INVENTION

Thus the inventor was motivated to create an efficient method to deliver and display a plurality of forms, items, menu commands, and advertising to mobile networked devices without having to reprogram said mobile networked devices to display each distinct said form or ad.

The inventor was also motivated to devise a service that would provide the flexibility of WML, WMLScript and WAP for the entity with the convenience and compactness of the downloaded application for the user. This solution would have to provide an ability to display all types of information, verify user input and limit the amount of data required to download to affect the relationship between user and entity. It would be a service to both entities and mobile networked device users.

The inventor recognized that the security restrictions enforced on mobile networked devices severely limits the variety of information presented from remote servers for bank balances, stock trading, health information, membership status and other sources for the user. In the current paradigm, the extent of change an application can affect is limited to the compiled code. If the remote server changes the order of the data or adds new data, a new compiled application must be loaded on the mobile networked device to display the new order of the data or the application will fail. The inventor was thus motivated to provide a means to work within the sandbox and security model to provide the capability to extend flexibility in the way the remote server data is displayed. Going beyond RSS and XML, the invention would have to react to instructions sent by a remote server to affect placement, behavior and logic on mobile networked devices.

To accomplish this, the inventor recognized that current programming technology for forms, items and menu commands on mobile networked devices could be abstracted, compiled and then downloaded to the mobile networked device, providing the capability to present all possible forms, items and menu commands behavior. Once the application, with all such logic compiled into the code, is loaded on the mobile networked device, new appearance and behavior in response to interactions would be triggered by supplying instructions and data files from a remote EWAS to the application code running on the device. The abstraction of the basic form, item and menu command capabilities presented by programming languages would enable the application to present variable format and information from all entities on the screen of the mobile networked device without downloading new code to the screen. Behavioral characteristics would be sent to the application via a text file or bitmap from the web application server in a proprietary format after the application loads, thus performing within the sandbox designed and enforced by the wireless network providers.

It is an object of the invention to program a mobile networked device to operate in accordance with a set of code, based upon a programming language, to provide a service which is used to send instructions to the said invention code running on the mobile networked device that triggers form, item and menu command capabilities in the code to present informational content on the mobile networked device screen.

It is further object of the invention to download URL locations from a EWAS that point to form instructions that are organized as a collection of forms that control the information to be displayed on the mobile networked device. The collections of form, item and menu command instructions are defined as a service to mobile networked device users and entities to present information the users want to view regarding the relationship with the entity and to further interact with the information on the forms to affect change to that relationship. Along with the URLs downloaded from the EWAS, initial collection of form instructions may be included to be displayed by the invention to authenticate or otherwise provide information about the user to the entity. The service enables entities to change the presentation order, format, behavior or validation of data sent to the mobile networked device without requiring the user to download of new compiled code.

The URL locations may be stored on the mobile networked device in storage and memory for display when the application is initiated. The URLs, including descriptions of the URL content, are displayed by the invention in one application suite which is activated when the user clicks the icon on the screen representing the invention. All URLs and form activity takes place within the invention application. The URLs to be displayed are selected by the user upon registering for the service either from the mobile networked device or from the web site displayed on the desktop. Future URLs can be selected from the mobile networked device by entering the name of the entity or the first few letters of the entity name. A network communication from the mobile networked device is initiated to the EWAS and if the entity subscribes to the service, the URL or a list of possible choices is returned to the mobile networked device for selection by the user.

It is a further object of the invention to provide a mechanism to initiate a network communication from the mobile networked device when the user selects a URL to download collection of forms, items and menu commands instructions from a EWAS running the server code of the invention. This communication can be defined to use https communication or other secure protocol. If initial form instructions are passed with the URL, this initial form is displayed on the invention for the user to enter data to pass to the EWAS. The information entered by the user is passed with the URL through a network communication to the EWAS. This information, which may identify and further define the relationship between the user and entity or the nature of the request from the user, can be further used by the EWAS to determine which collection of forms instructions and information to be sent back to the invention on the mobile networked device. In summary, the EWAS returns a collection of forms, instructions triggering form, item and menu command capabilities that display the relationship information between the user and entity on the mobile networked device.

Instructions for forms, items and menu commands include, but are not limited to, information relating to screen placement and all possible formatting and input validation options available to the item such as, but not limited to, ranges for dates and numeric items; total number of characters allowed for text plus upper and lower case; currency type and decimal point accuracy; number of items in a list; and number of selections allowed from lists. These formatting options can be stored in a bitmap or string and are downloaded as part of the collection of forms instructions to be decoded and implemented by the invention on the mobile networked device. The formatting and validations are handled by a listener for each form, item and menu command type and is activated when the form or item is instantiated. Alert screens with error messages are displayed by the listeners when data entered by the user violates one of the validation rules.

It is another object of the invention to initiate a network communication from the mobile networked device when the user clicks on a menu command or an item on the form that has been defined by the previously downloaded instructions to initiate communication back to the EWAS. When such a request takes place, the information from the user interaction on the form is sent to the EWAS along with user identification and other security data. After receiving and analyzing the information returned by the user, the EWAS may return updated information to be displayed on the form, more information to be displayed on a different form defined in the initial instructions, a new collection of forms instructions, or initiate a transaction on the EWAS to modify the relationship between the entity and user and return an acknowledgment.

The information displayed in the items on the forms are transferred over the network communication using XML or more lightweight data-interchange formats such as JavaScript object Notation (JSON) or the proprietary more compact abbreviated format used in the implementation which may be part of or is independent of the programming language. The invention parses the formats and places the information into the items on the form on the mobile networked device. The form and item instructions are in a proprietary format developed for the invention.

It is a further object of the invention to provide a mechanism to interpret the downloaded instructions from the EWAS to trigger form, item, menu command capabilities in the invention to display the downloaded informational content on the screen of the mobile networked device and to affect the appearance and behavior of the form while the user interacts with the form. When the user is finished with the forms from one entity, he/she can select another form URL from the main list and the invention clears the screen and memory of the previous forms and initiates a network communication to download another collection of forms and information from the selected EWAS representing the same or another entity.

Collection of forms presented on the mobile networked device screen may be part of an application or independent of a particular application. The code is self contained and can be embedded in a stand alone application code, a browser plugin or a background thread running on startup of the mobile networked device. The inventor therefore surmised that the most appropriate descriptive name for the invention should be Active forms Content Delivery Service for entities and Mobile Handheld Device Users or Active forms.

Moreover, the invention is a set of code which defines all aspects of logic for information display and interaction on a mobile networked device which may include, but not limited to, text, text field, image, numeric, currency, labels, lists, content lists, and ChoiceGroups. The combination, instantiation and presentation of these forms are organized as collections and are defined in detailed instructions downloaded to the invention application running on a mobile networked device. These instructions are used by the invention application to trigger said code to be activated to display the data and verify and respond to user interaction on the form. All forms of a collection are held in an array in the code on the device. Once all forms have been loaded in the array, a background process is started on the device in accordance with the invention to download data from the EWAS that further defines the relationship between the entity and the user.

The invention application then presents the data in the forms on the mobile networked device screen. Thus the instructions are used by the invention to present information on the screen of the mobile networked device using the appropriate items for the data. The entity may change the instructions on the EWAS so the next time the user downloads said collection of forms instructions, a new item or menu command order, appearance, behavior; user interaction behavior or validation is changed without the entity having to recompile the code or the user having to download a new compiled application from said entity.

The forms may be stored in an erasable memory such that the forms may be overwritten with other form data. For example, after the user has finished viewing or interacting with a form, he/she may click on another URL to request forms from a different entity and the current forms will be replaced with new forms. The invention initiates a network communication and requests the new forms; the invention removes all forms and items from the screen, clears out the forms array and reclaims memory.

The invention then reads the new forms instructions, stores them in memory, and then builds the forms on the screen of the networked mobile device.

Along with items offered by the J2ME implementation language, the invention also includes a method for dynamically displaying informational content in an array of Content Lists. Reading and interpreting the abbreviated XML feeds or JSON sent from a web application server, the invention creates a title for the Content List and a button or command for selecting the list, depending on the mobile networked device implementation, in a menu created by the application. The invention then creates a list in which tags lines for the informational content are stored. The detail, description or story for each tag line is stored in memory with a key identifying it with the tag line. When items are selected and submitted, the key is sent back to the EWAS to show which item the user selected. The detail or story or description for each tag line is displayed in a separate window on the mobile networked device when the user selects or clicks on the tag line. These Content Lists are stored in an array of lists in the invention and the when the user selects or clicks on a button or command created for the individual list in the application menu, the different Content Lists are displayed on the mobile networked device screen.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Although the techniques are described below primarily in the context of the Java J2ME platform, the techniques are also applicable in connection with other platforms for supporting client-side application processing, such as BREW, C++, Windows Mobile, Flash Lite and Motorola's iDEN technology, and in connection with implementations of server-side applications, such as applications that use WAP technology. One or more collection of forms may be stored in memory on a mobile networked device at any given time and a process may be provided for determining which form to display and when to download new information and collection of forms instructions. The forms may additionally or alternatively include an audio or video component.

Applications stored on the mobile networked device, may include the invention or the invention itself can be downloaded separately. Applications, using Active forms, parts of Active forms or Active forms itself may therefore be easily loaded onto the mobile networked device.

Figure 1:
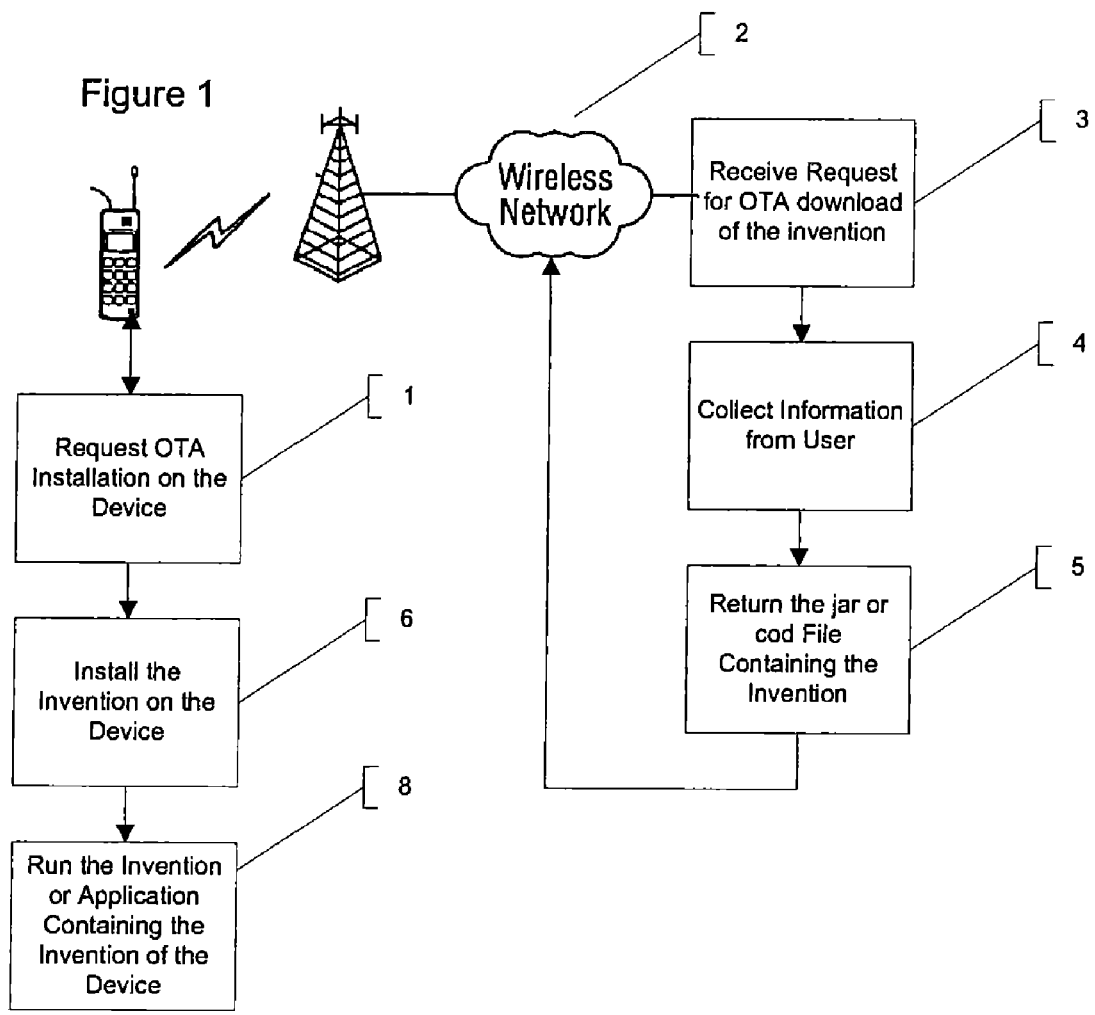
FIG. 1 is a flow diagram of the method used to download the application in accordance with the invention to the handheld mobile networked device.

FIG. 1 is a flow diagram of how the invention is downloaded by the user and installed on a mobile device supporting J2ME. A J2ME jar or cod file is requested by the user from the handheld device (step 1) over the air or OTA (step 2). When the web server receives the request from the mobile device (step 3) it may request information from the mobile device user including, but not limited to name and demographics, occupation and interests (step 4). The application with the invention embedded or by itself is sent to the mobile device (step 5) OTA (step 2). The user then selects to install the invention or application containing the invention on the mobile device (step 6). The user then runs the invention or application containing the invention on the mobile device (step 8).

Figure 2:
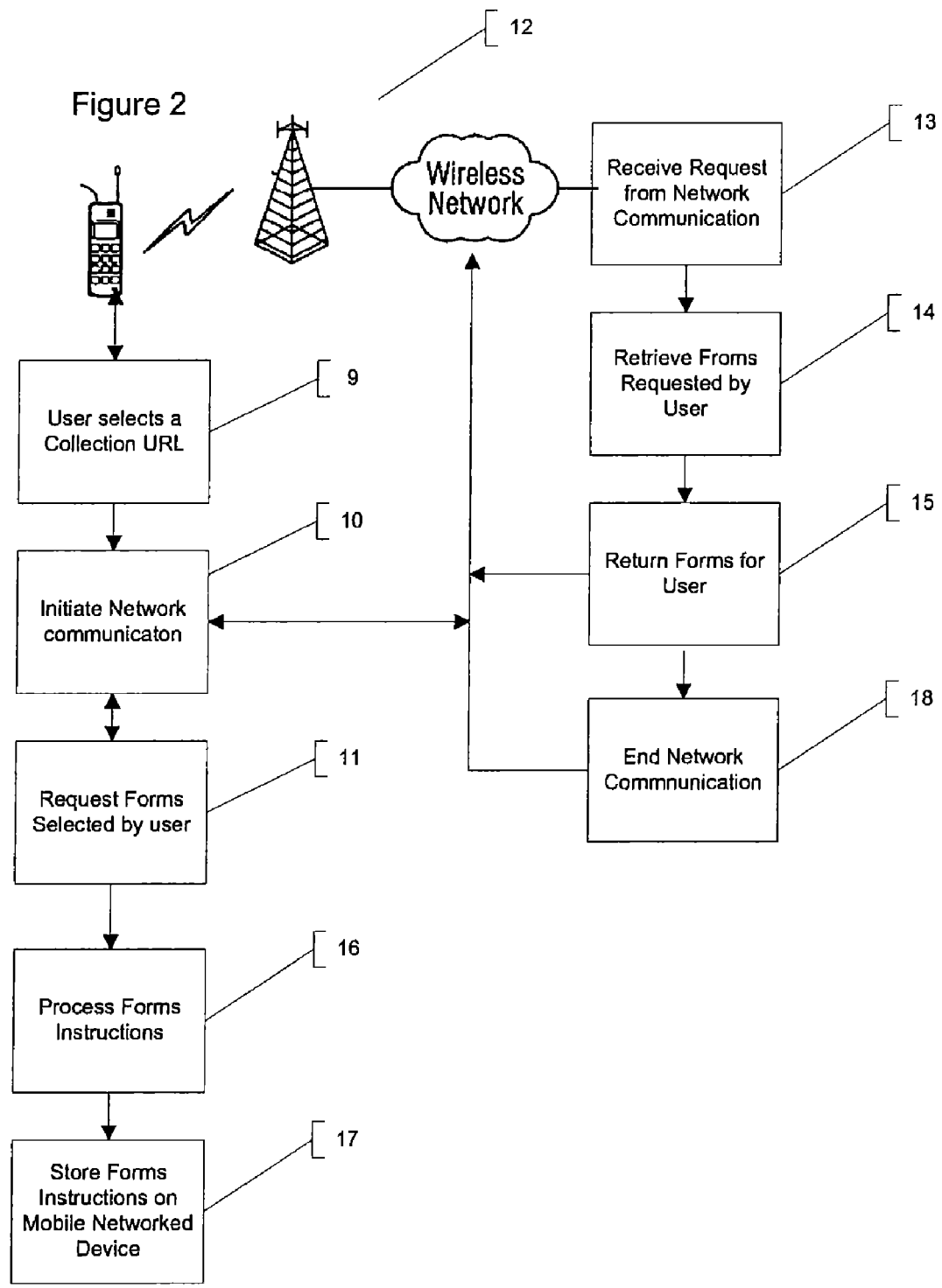
FIG. 2 is a flow diagram of the process for retrieving an entity form URL from the EWAS or searching for an entity form URL from the EWAS and then communicates with the EWAS, in accordance with the invention, to retrieve collection of forms instructions and information to be displayed on the form.

FIG. 2 is a flow diagram of the invention downloading collections of forms instructions on a mobile device. The invention may be stored on the mobile device at the time of manufacture or may be subsequently loaded onto the device over a network, including through the use of an over the air (OTA) downloading procedure. The user selects a collection URL from the collections list on the mobile networked device (step 9). The invention on the mobile device requests communication with a web application server (step 10) over the air (step 12) and requests collections of form instructions from the application server (step 11), passing user credentials and possibly location information, utilizing Global Positioning Technology on the mobile device. The web application server receives the request for collections of forms instructions (step 13) over the connection (step 12). Instructions for collections of forms are retrieved from a data store (step 14) and returned over the network connection to the invention on the mobile device (steps 15 and 12). The invention on the mobile device processes the information for the collections of forms and stores the information on the mobile device (steps 16 and 17). The network connection is then closed (step 18).

Figure 3:
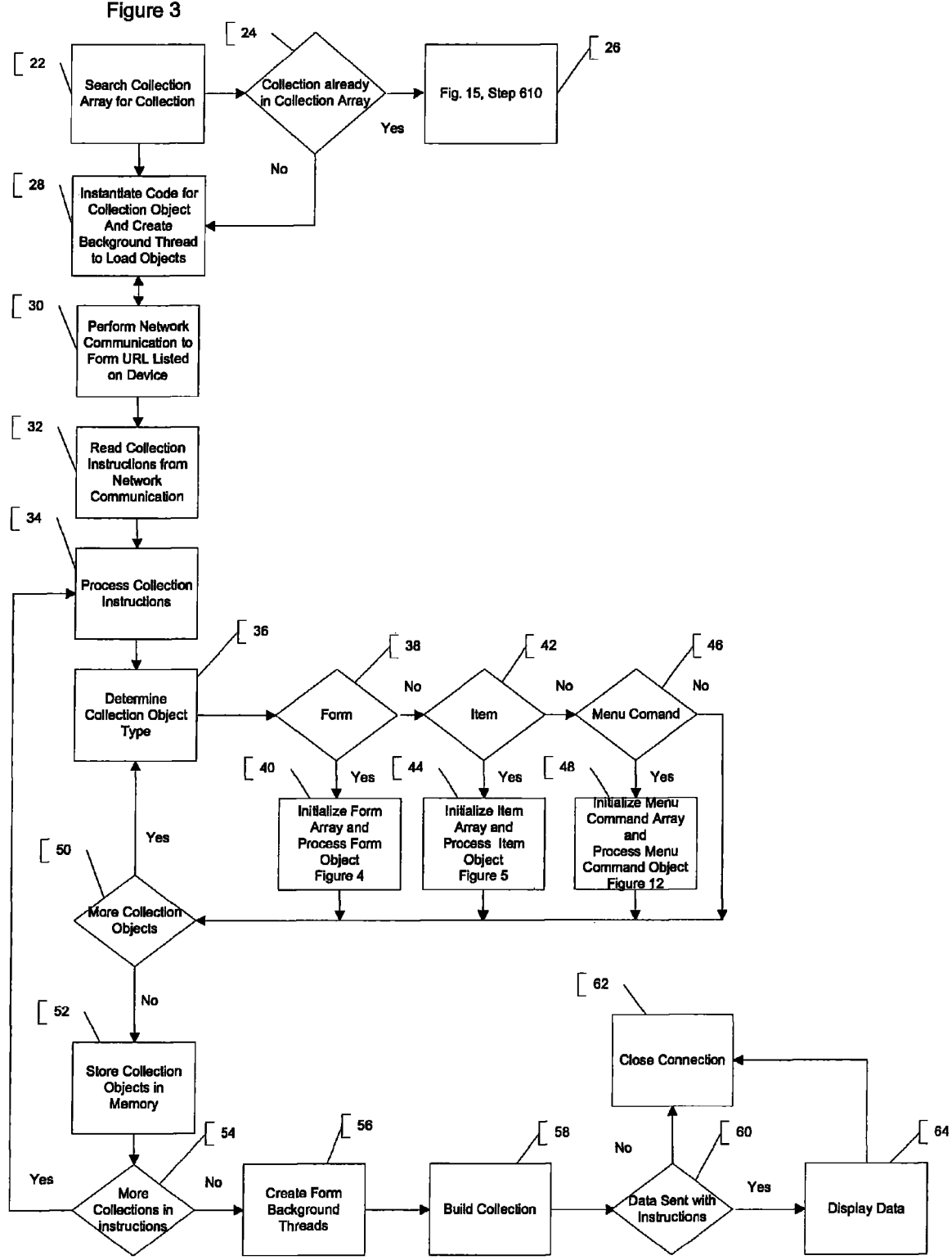
FIG. 3 is a flow diagram of the method used in the invention to load a collection of forms, items and menu commands instructions sent by the EWAS to the mobile networked device.

FIG. 3 is a flow diagram of how a collection forms is processed by the invention and stored on the mobile device. The invention begins by searching the collection array for the collection number (step 22). If it exists, then the current run collection is set to the existing collection in the array and control is transferred to FIG. 15, step 610 (step 26). If the collection is not in the collection array, code is instantiate to store it and a background thread is created to read and store the collection (step 28). The invention then requests information from a web application server (step 30). Collection instructions are then read and processed (step 32 and 34) as either a form, item or menu command (steps 36 to 48). Each collection object Type is stored in an array as part of the collection and the routine is called to process the collection object (steps 40, 44, and 48). If more collection objects exist (step 50), the invention loops through steps 36 to 48 again. If not, then the collection object is stored in the memory (step 52). The invention then checks to see if another collection has been sent (step 54) and if so, it processes it (steps 34 to 52). If not, then the background thread is stopped and a new background thread is started to build the first collection (steps 56 and 58) and check to see if data was sent with the collection (step 60). If so, display the data (step 64). If not, then close the network communication (step 62).

Figure 4:
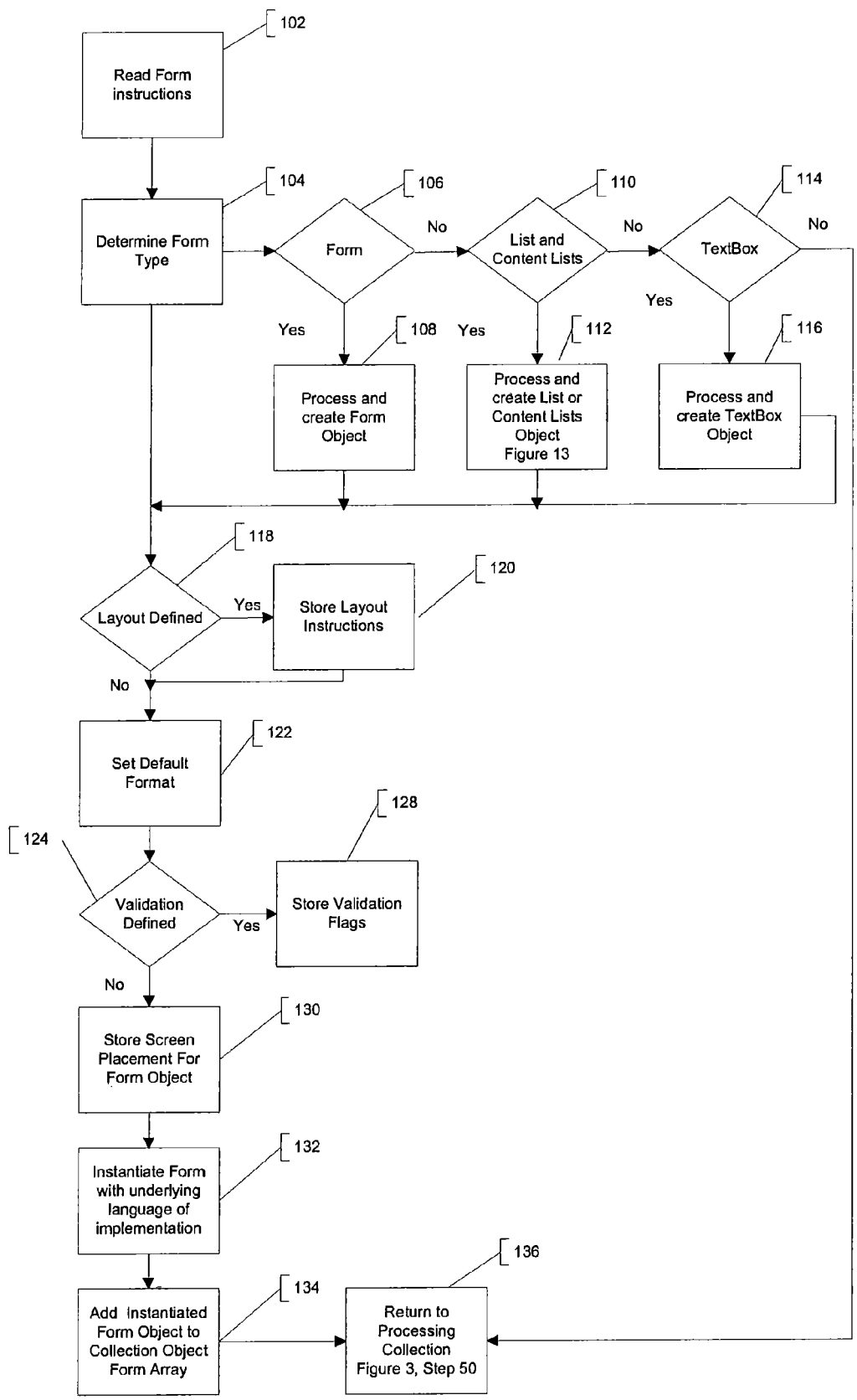
FIG. 4 is a flow diagram of the method used in the invention to load form objects into the invention on the mobile networked device.

FIG. 4 is a flow diagram that describes how a form is loaded into a collection. The form type is identified in FIG. 3 step 40 and instructions are processed (step 102) to determine form type (step 104). Form object types are Form, List or Content Lists, and TextBox. List, and Content Lists are separate Active Forms objects, but are implemented with Content Lists: a List is a singular Content List. Other underlying programming languages may dictate a different implementation.

The form is processed and created for the respective implementation form type in steps 106 through 116 or control is transferred back to FIG. 3 step 50 (step 136). Any layout for the form type defined in the instructions is added to the form object (steps 118 to 120) or the default format for the form type is defined (step 122). If any validation for the form type is defined in the instructions, it is stored in the form object (steps 124 to 128). Screen placement instructions for the form object is then added (step 130). The invention then uses the information stored in the form object to instantiate the form with the underlying programming language of implementation (step 132). The instantiated form is stored with the abstracted form object (step 134) and control is returned to processing the collection (FIG. 3, step 50).

Figure 5:
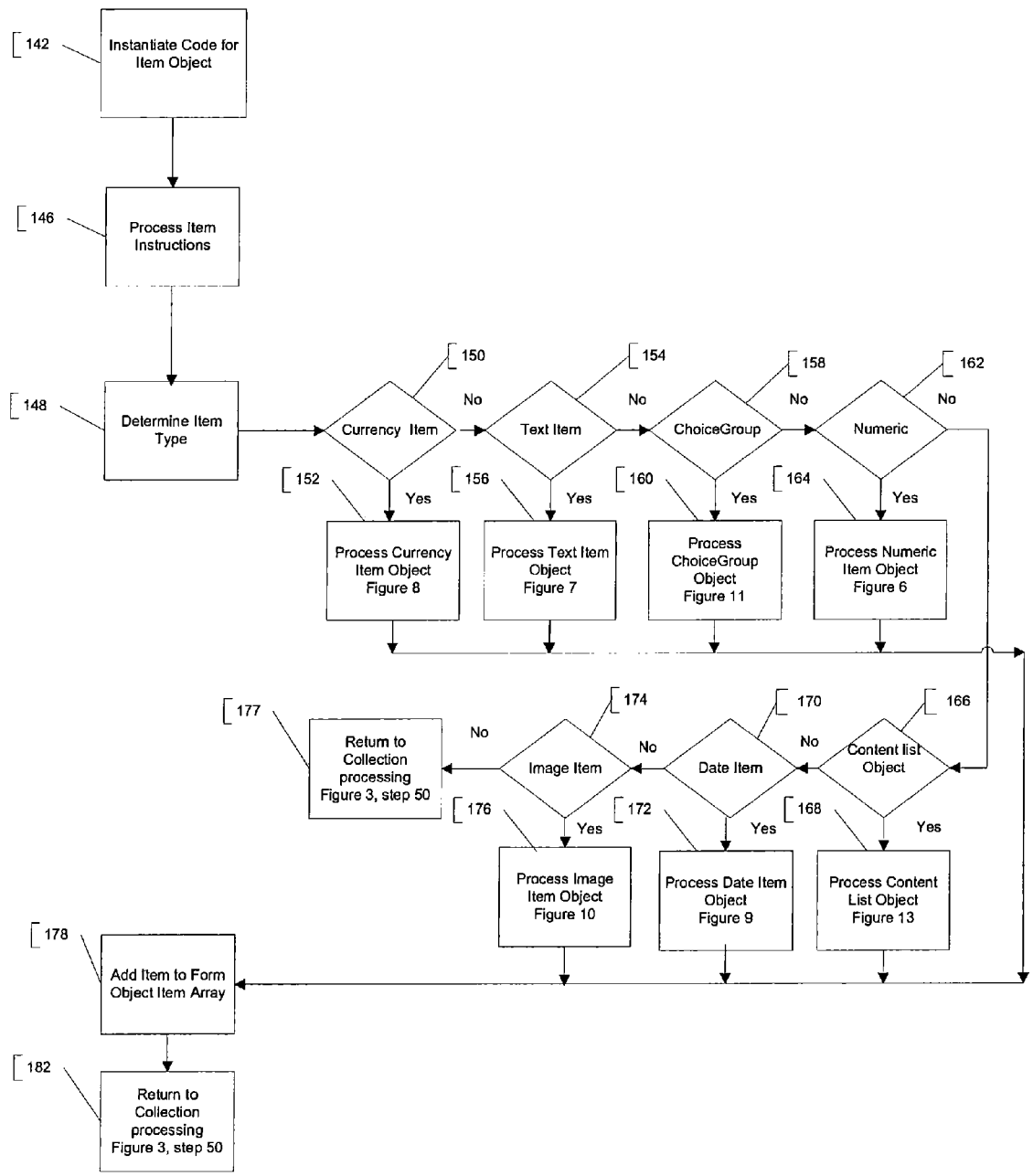
FIG. 5 is a flow diagram of the method used in the invention to load item objects into the invention on the mobile networked device.

FIG. 5 is a flow diagram that describes how items are added to a form. The item object is instantiated and instructions are processed (steps 142 and 146) and the item type is determined (step 148). Based upon the item type, instructions are used to process information related to the respective item types (steps 150 through 177). The item object is then added to the form object item array (step 178). Control is returned to collection processing FIG. 3, step 50 (step 182).

Figure 6:
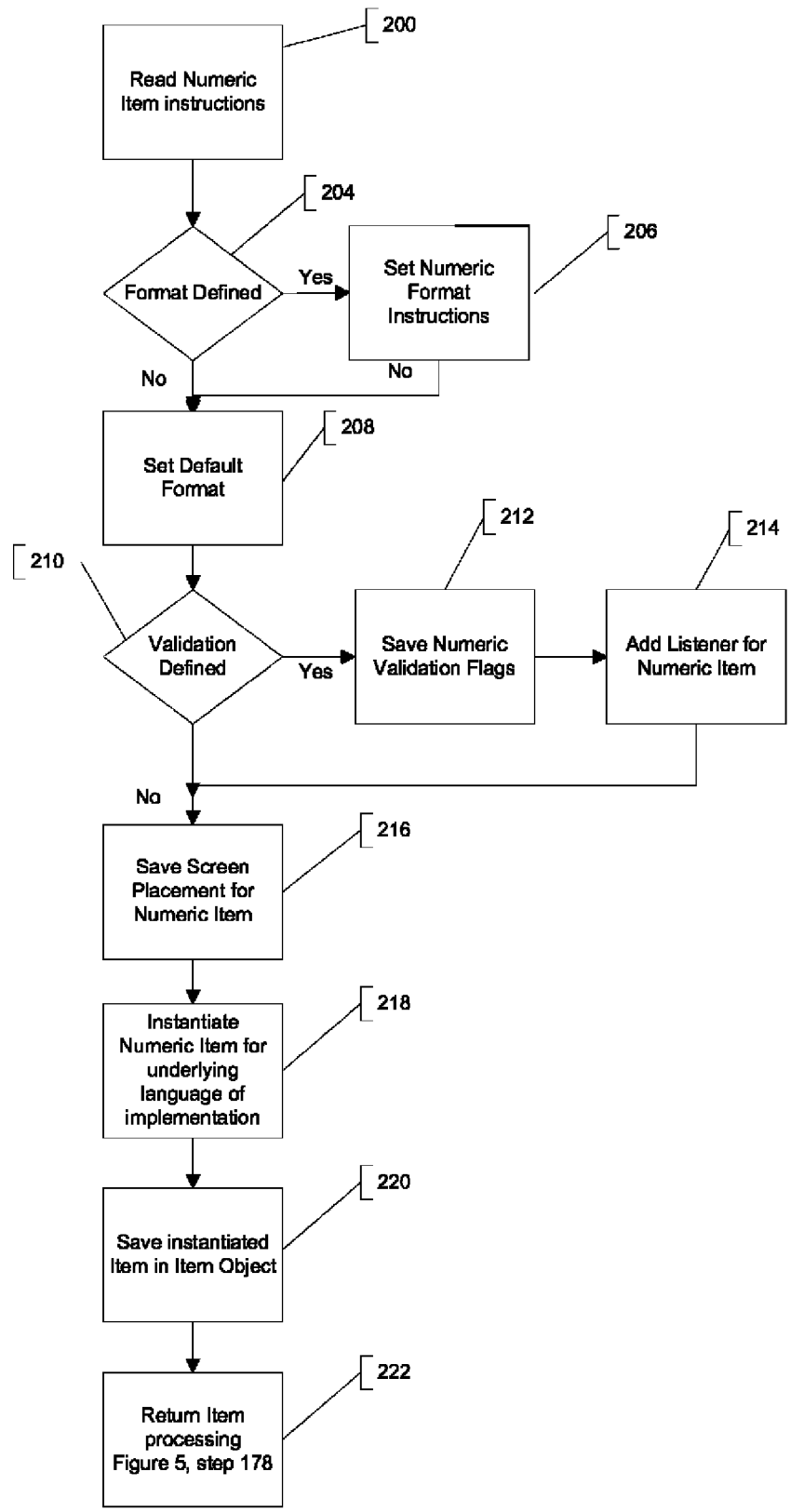
FIG. 6 is a flow diagram of the process for loading a numeric item to a form in the invention on the mobile networked device.

FIG. 6 is a flow diagram that describes how a numeric item is added to a form. The item instructions are read (step 200). If a format has been defined for the numeric item, it is set in the object (step 204 to 206); otherwise, the default format is set (step 208). If validation has been defined, it is set in the item object and a listener is defined for the item (steps 210 through 214). Screen placement instructions are then set in the item object (step 216). The numeric item is then instantiated for the underlying language of implementation (step 218) and stored in the item object (step 220). Return is then passed to item processing in FIG. 5, step 178 (step 222).

Figure 7:
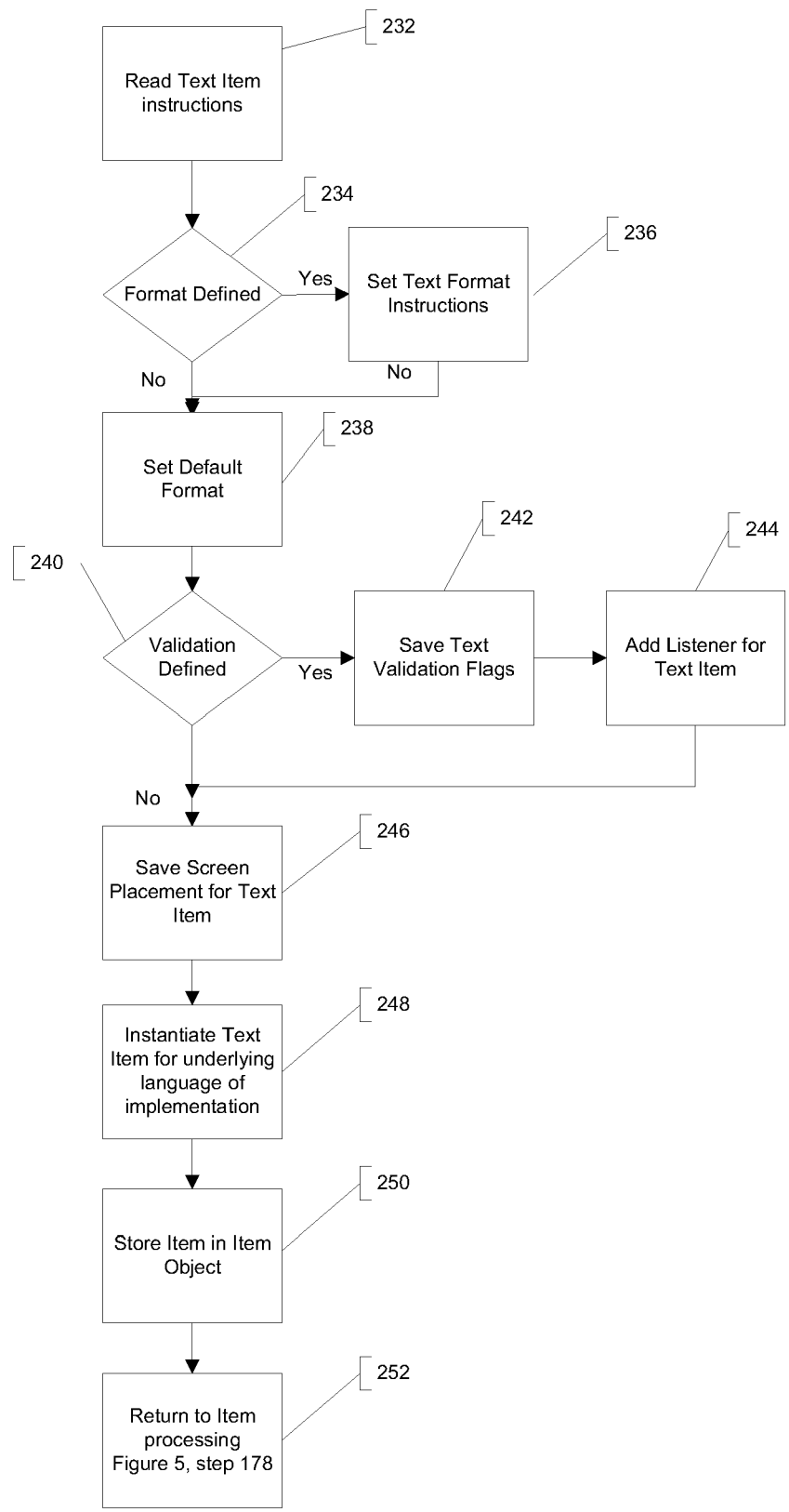
FIG. 7 is a flow diagram of the process for adding a text item to a form in the invention on the mobile networked device.

FIG. 7 is a flow diagram that describes how a text item is added to a form. The item instructions are read (step 232). If a format has been defined for the text item, it is set in the object (step 234 to 236); otherwise, the default format is set (step 238). If validation has been defined, it is set in the item object and a listener is defined for the item (steps 240 through 244). Screen placement instructions are then set in the item object (step 246). The text item is then instantiated for the underlying language of implementation (step 248) and stored in the item object (step 250). Return is then passed to item processing in FIG. 5, step 178 (step 252).

Figure 8:
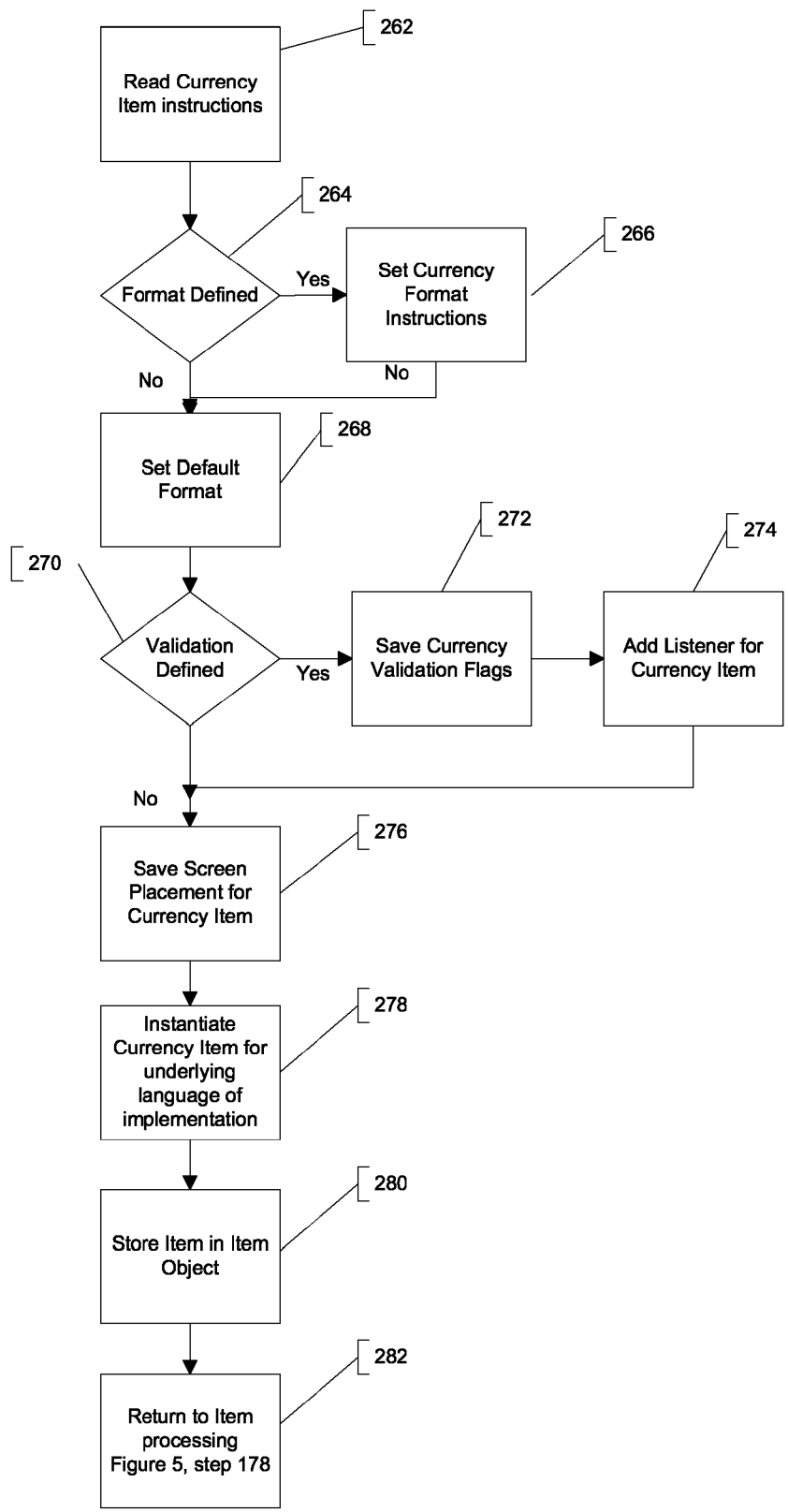
FIG. 8 is a flow diagram of the process for loading a currency item to a form in the invention on the mobile networked device.

FIG. 8 is a flow diagram that describes how a currency item is added to a form. The item instructions are read (step 262). If a format has been defined for the currency item, it is set in the object (step 264 to 266); otherwise, the default format is set (step 268). If validation has been defined, it is set in the item object and a listener is defined for the item (steps 270 through 274). Screen placement instructions are then set in the item object (step 276). The currency item is then instantiated for the underlying language of implementation (step 278) and stored in the item object (step 280). Return is then passed to item processing in FIG. 5, step 178 (step 282).

Figure 9:
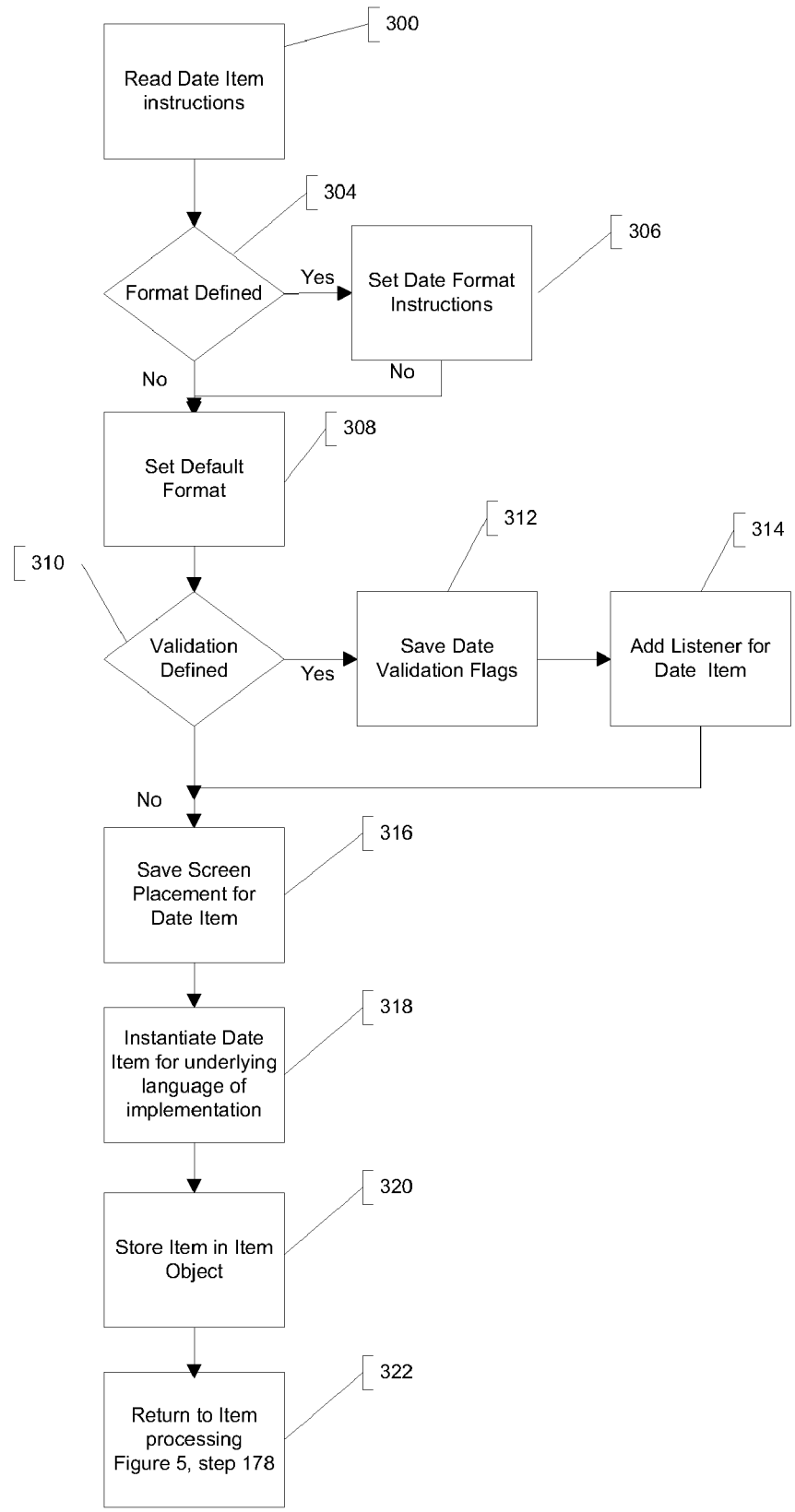
FIG. 9 is a flow diagram of the process for loading a date item to a form in the invention on the mobile networked device.

FIG. 9 is a flow diagram that describes how a date item is added to a form. The item instructions are read (step 300). If a format has been defined for the date item, it is set in the object (step 304 to 306); otherwise, the default format is set (step 308). If validation has been defined, it is set in the item object and a listener is defined for the item (steps 310 through 314). Screen placement instructions are then set in the item object (step 316). The date item is then instantiated for the underlying language of implementation (step 318) and stored in the item object (step 320). Return is then passed to item processing in FIG. 5, step 178 (step 322).

Figure 10:
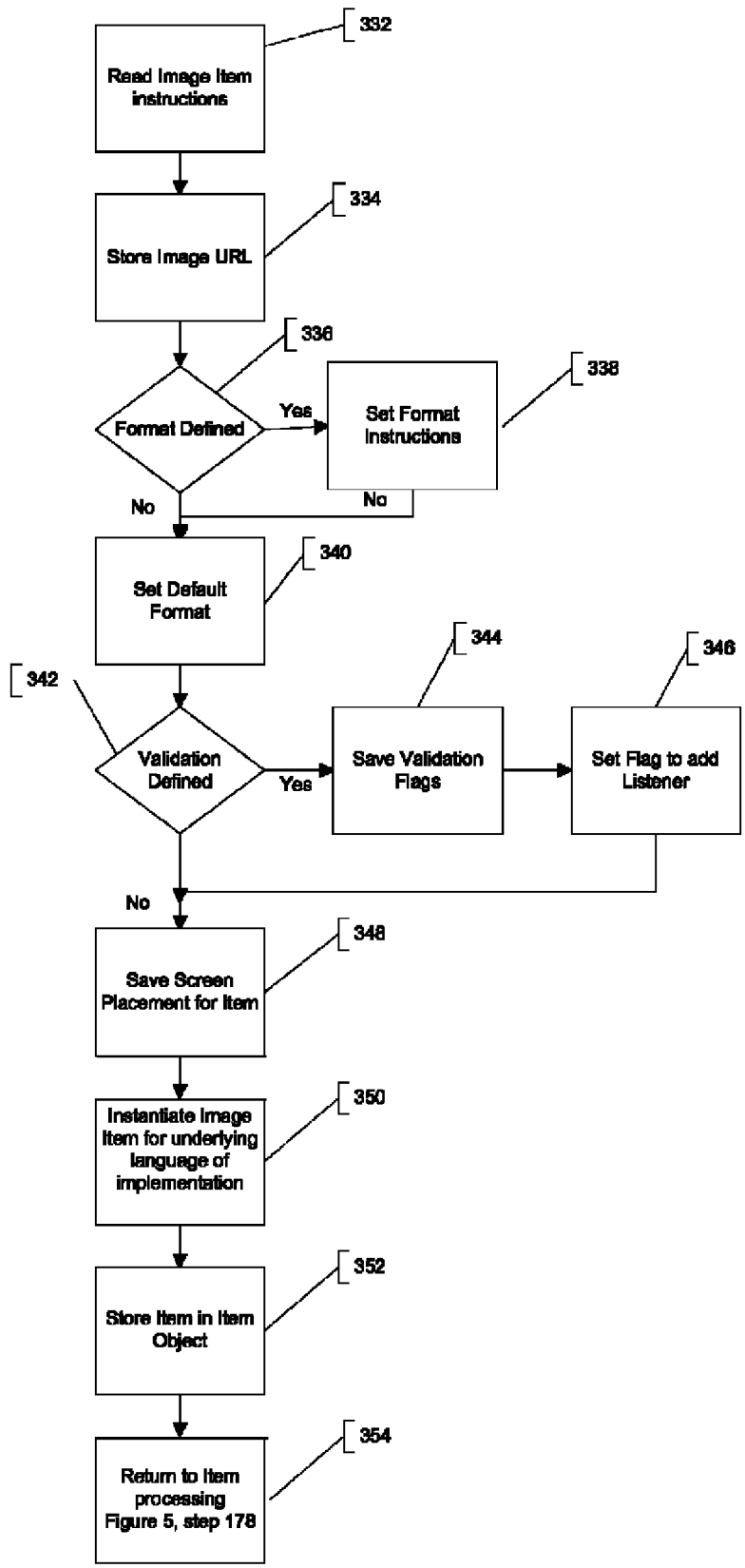
FIG. 10 is a flow diagram of the process for adding an image item to a form in the invention on the mobile networked device.

FIG. 10 is a flow diagram that describes how an image item is added to a form. The item instructions are read (step 332) and the image URL is stored in the item object (step 334). If a format has been defined for the image item, it is set in the object (step 336 to 338); otherwise, the default format is set (step 340). If validation has been defined, it is set in the item object and a listener is defined for the item (steps 342 through 346). Screen placement instructions are then set in the item object (step 348). The image item is then instantiated for the underlying language of implementation (step 350) and stored in the item object (step 352). Return is then passed to item processing in FIG. 5, step 178 (step 354).

Figure 11:
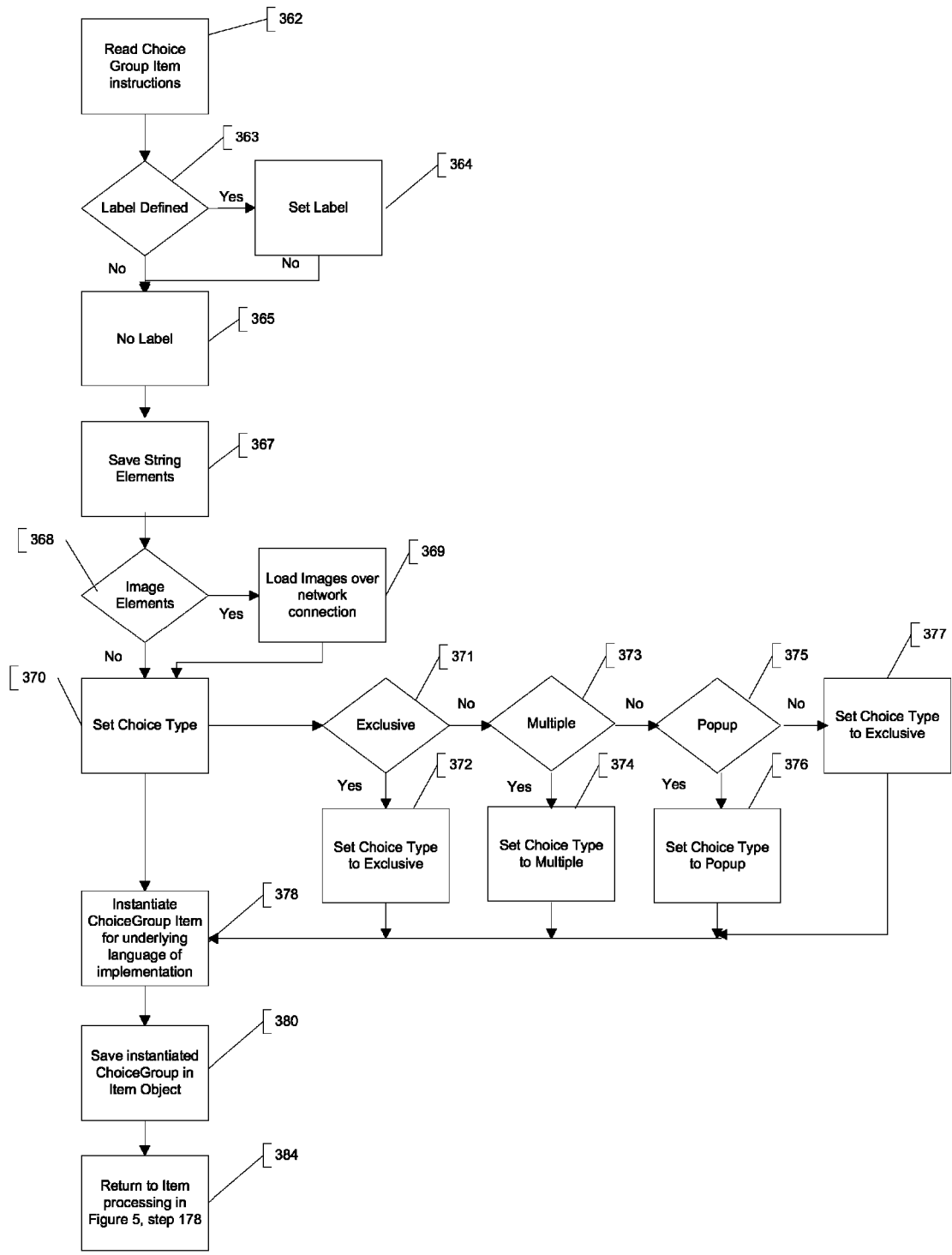
FIG. 11 is a flow diagram of the process for adding a ChoiceGroup to a form in the invention on the mobile networked device.

FIG. 11 is a flow diagram that describes how a Choice-Group item is added to a form. The item instructions are read (step 362). If a Label for the ChoiceGroup has been defined in the instructions, then it is added to the item object (steps 363 and 364). If no label has been defined, then no label is stored (step 365). String elements must be defined in the instructions to provide the choices and they are stored in the item object (367). The Sun Java J2ME underlying Language allows for image elements to be defined for the choices. Due to bandwidth limitations, it is highly discouraged but allowed in the implementation. The default is no images. If image elements are defined, then they must be retrieved over a network connection (steps 368 and 369). The ChoiceGroup type is set with an indicator in the instructions (steps 370 through 377). The ChoiceGroup is then instantiated with the underlying language of implementation and added to the item object (steps 378 and 380). Control is then passed to item processing in FIG. 5, step 178 (step 384).

Figure 12:
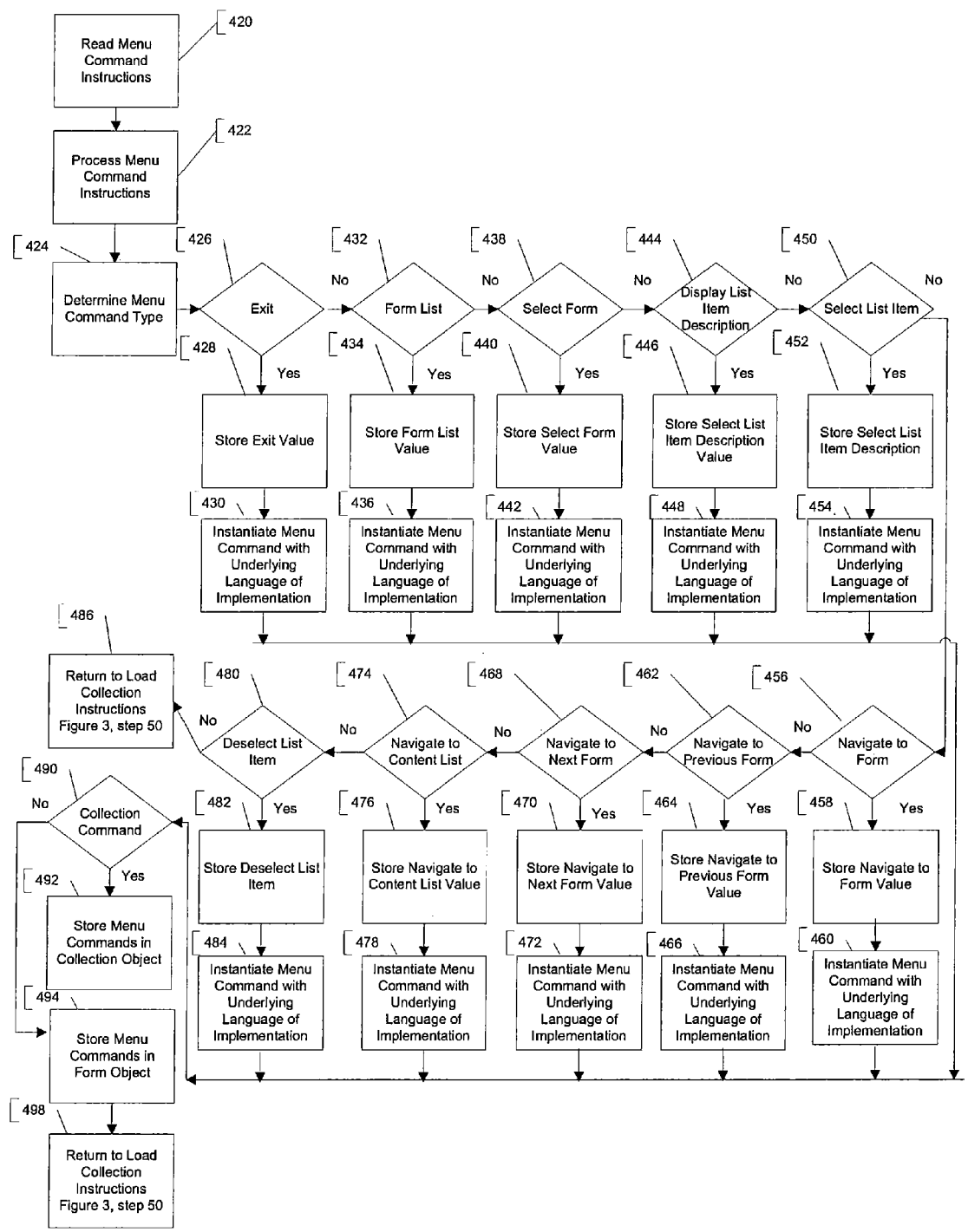
FIG. 12 is a flow diagram of the process for loading menu commands into the invention on the mobile networked device.

FIG. 12 is a flow diagram that describes how menu commands are added to a collection and forms. Menu command instructions are read and processed (steps 420 and 422). The menu command type is used to determine the action taken by the menu command (steps 426, 432, 438, 444, 450, 456, 462, 468, 474, or 480). If it does not match, then return to FIG. 3 step 50 (step 486). Different integer values are stored in the menu command type to be used by the invention in the command action listener to determine the action to take (steps 428, 434, 440, 446, 452, 458; 464, 470, 476, or 482). The menu command is then created with the underlying programming language (steps 430, 436, 442, 448, 454, 460, 466, 472, 478, or 484). Based upon an indicator in the instructions, the menu command is then stored either in the collection menu command array or form menu command array (steps 490 through 494). A collection menu command is displayed for all forms in a collection, whereas a form menu command is only displayed for the form. Finally, control is returned to FIG. 3, step 50 (step 498).

When a collection is loaded and running on the mobile networked device, a commandAction method is used in the J2ME implementation to check the integer value of the menu command and then take the action described in steps 428, 434, 440, 446, 452, 458, 464, 470, 476, or 482. This is how the user navigates among forms and collections loaded in the invention.

Figure 13:
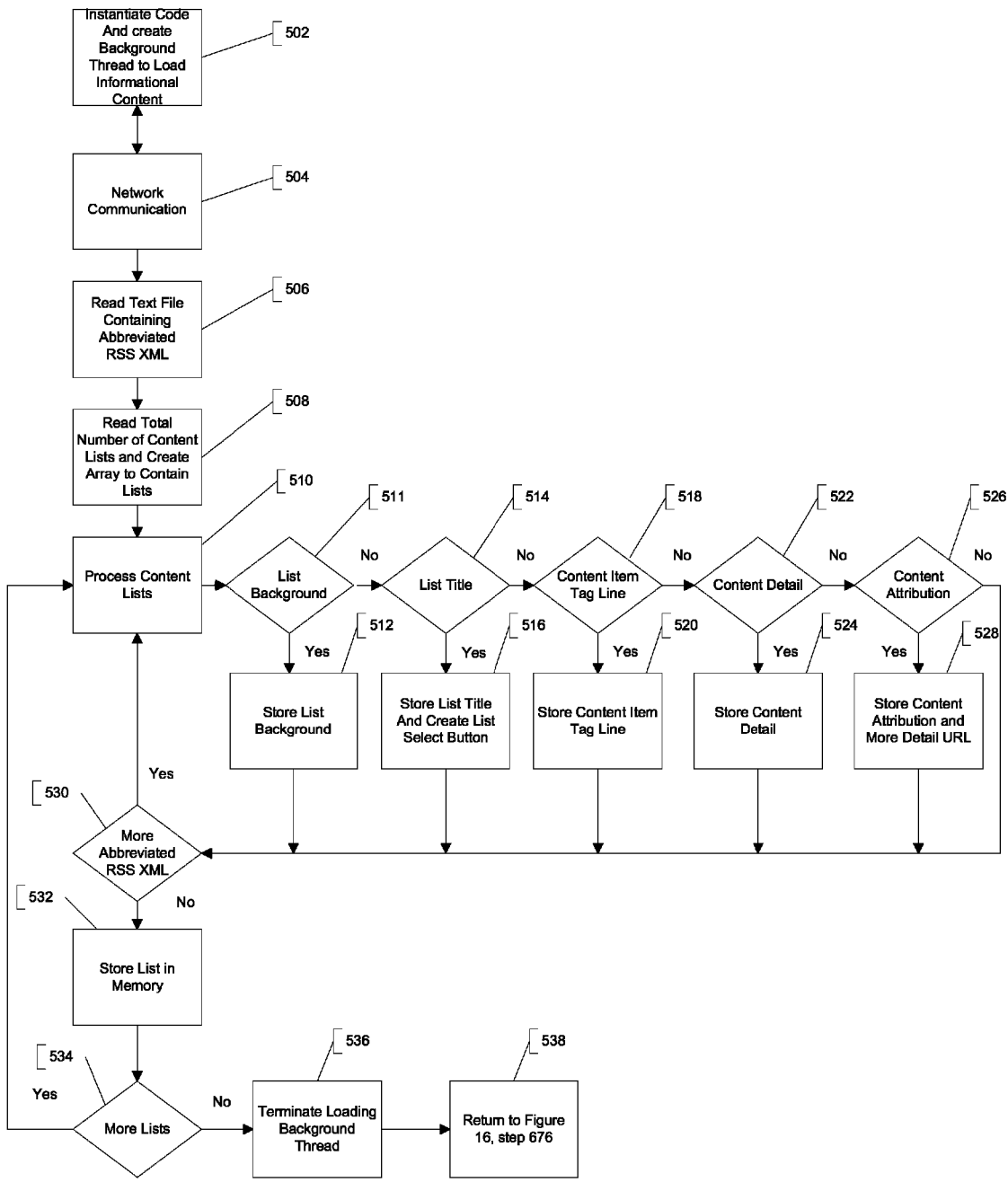
FIG. 13 is a flow diagram of the process for loading a Content List item into the invention on the mobile networked device.

FIG. 13 is a flow diagram that describes how Content Lists are created from abbreviated XML or RSS feeds from a web application server in the invention. A background thread is created by the invention for reading and storing the informational content into a Content List (step 502). Through network communication (step 504), the text file sent by the web application server is read and the XML is interpreted (step 506). The XML contains the total number of lists included in the text file and this is used to create the array of Content Lists (step 508). The abbreviated XML tags are used by the invention to create the Content Lists and its components: background, title, tag line, detail description and content attribution with URL (steps 510 through 528). If more XML is in the text file it is processed (step 530) and if not, the Content List is stored in memory (step 532). If more Lists are to be loaded (step 534), then they are processed (step 510 through 532). The background thread is terminated (step 536) and control is returned to FIG. 16, step 676 (steps 538).

Figure 14:
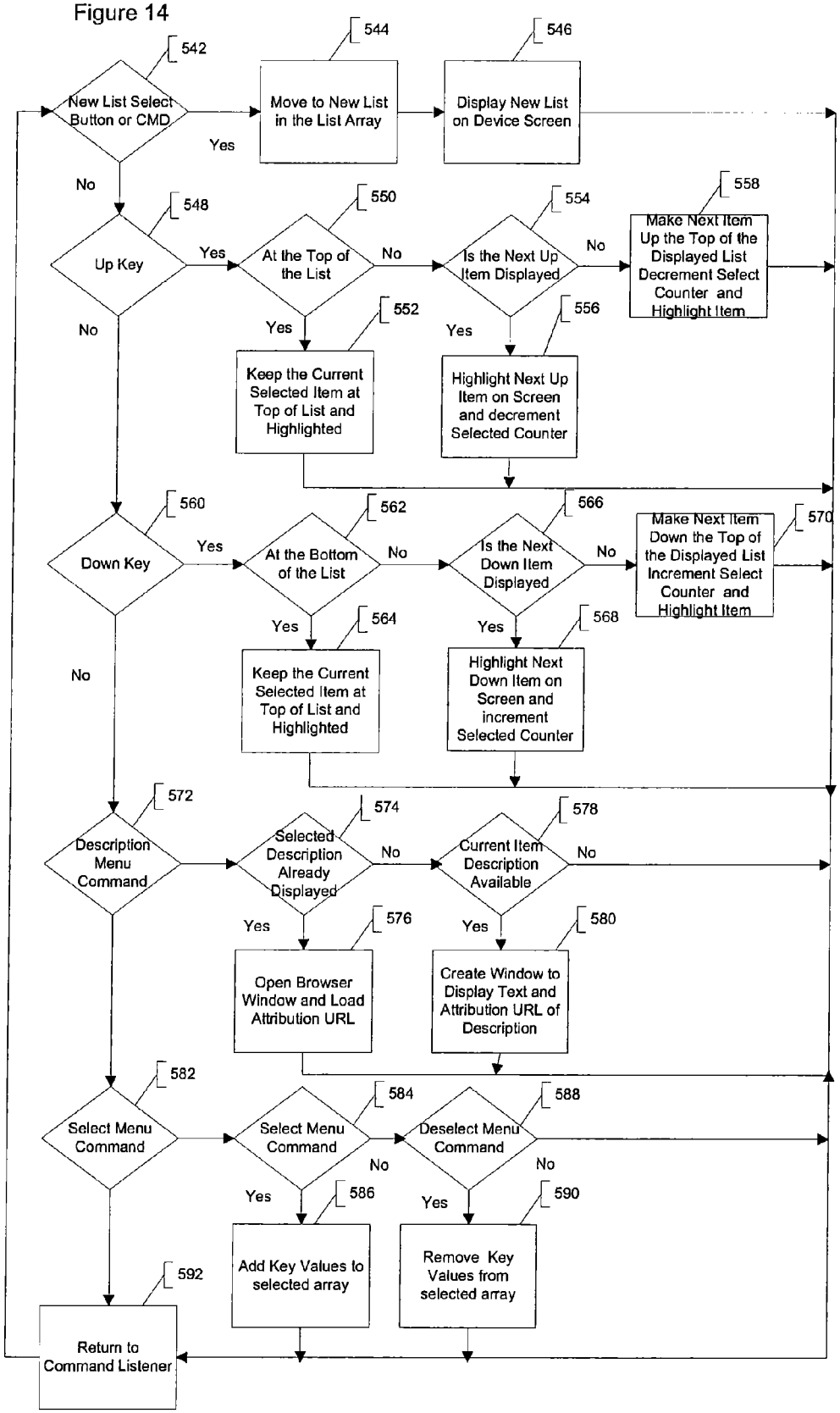
FIG. 14 is a flow diagram of the process for running a Content List item in the invention on the mobile networked device.

FIG. 14 is a flow diagram that describes how a Content List item behaves in the Invention. Content Lists always respond to keyboard instructions, if they have focus. If the user selects a Content List menu command in the menu (step 542), the corresponding Content List is retrieved from the array of Content Lists in the item and displayed on the device screen (steps 544 and 546) and control is passed back to the command Listener (step 592).

If the Content List has focus and the is up key is pressed (step 548), a check is done to see if the top of the list is already highlighted (step 550). If so, do not change the item highlighted and do not change the top of the list (step 552). If not, then check to see if the next item up on the list is already displayed on the screen (step 554). If so, then highlight the next item up in the list and decrement the selected counter (step 556). If not, then make the next item up in the list the top of the displayed list, highlight that item on the screen and decrement the selected counter (step 558) and control is passed to the command Listener (step 592).

If the Content List has focus and the down key is pressed (step 560), a check is done to see if the bottom of the list is already highlighted (step 562). If so, do not change the item highlighted and do not change the top of the list (step 564). If not, then check to see if the next item down on the list is already displayed on the screen (step 556). If so, then highlight the next item down in the list and increment the selected counter (step 568). If not, then make the next item down in the list the bottom of the displayed list, highlight that item on the screen and increment the selected counter (step 570) and control is passed to the command Listener (step 592).

If the Content List has focus and the Description menu command is selected (step 572), a check is done to see if the detailed description is already displayed (step 574) and if so, direct the device to load the attribution URL into the browser (step 576). If not, then check to see if the detailed description is available (step 578). If it is available, then display the detailed description in a new window (step 580) and control is passed to the command Listener (step 592).

If the Select menu command is selected (step 582), then a check is made to see if it is the Select menu command or the Deselect menu command (steps 584 to 588). If it is the Select menu command, then key values are added to the selected array (step 586). If it is the Deselect menu command, then remove key values from the selected array (step 590). Control is then passed to the command Listener (step 592).

Figure 15:
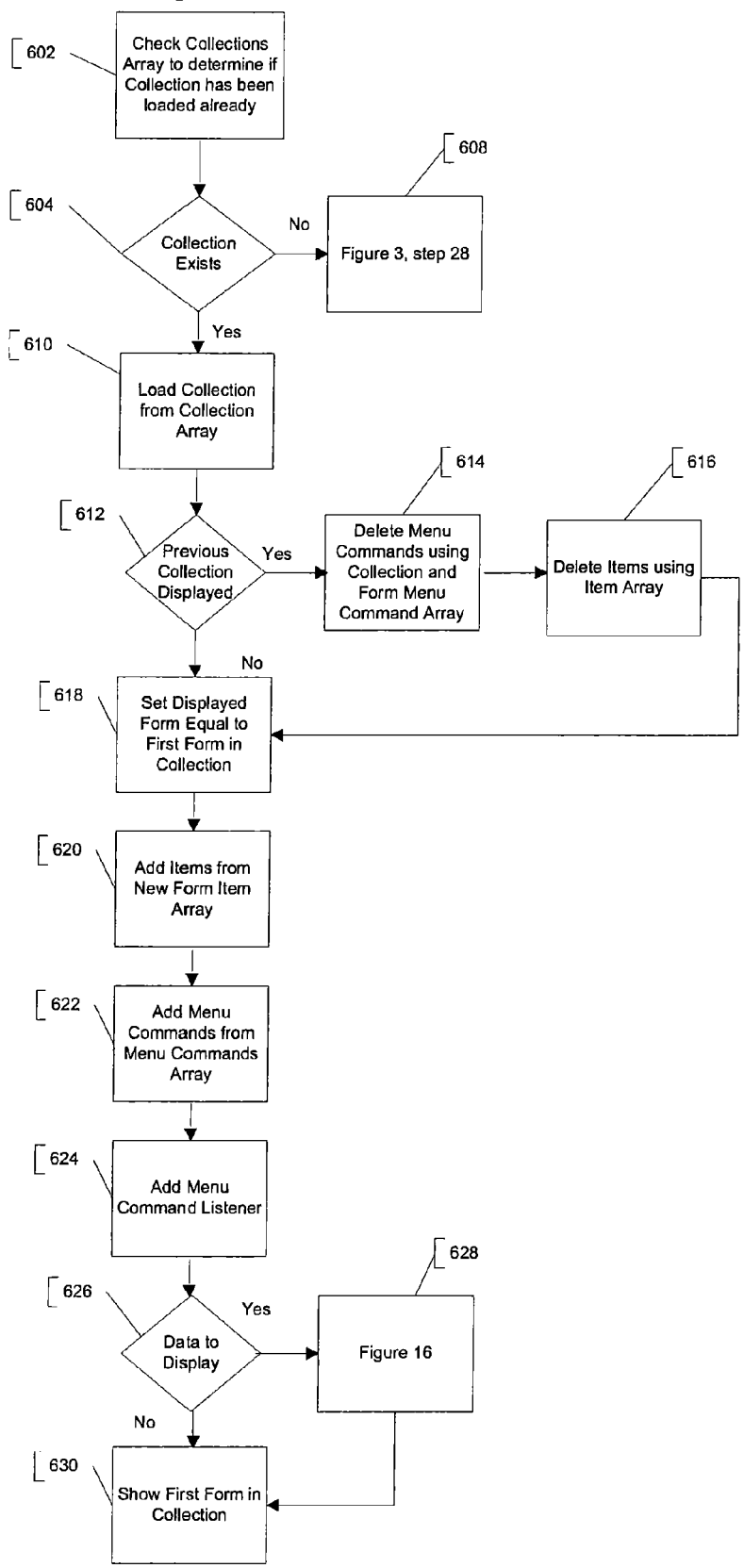
FIG. 15 is a flow diagram of the process for displaying a stored collection of forms, items and menu command on the mobile networked device.

FIG. 15 is a flow diagram that describes the process for displaying a stored collection of forms, items and menu command on the mobile networked device. First the collections array is checked to see if the collection has already been loaded (step 602). If the collection does not exist, then control is transferred to FIG. 3, step 28. If it does exist, then the current collection array is set to the new collection array (step 610).

If a previous collection is displayed (step 612), the displayed underlying programming language objects are removed from the current collection using the previous collection array of forms, items and menu commands (steps 614 and 616). The current displayed form is then set to the first form in the new collection (step 618) and items; menu commands; and the menu command listener are added to the current form from the collection items and menu commands arrays (steps 620 and 624). If data is to be displayed, control is transferred to FIG. 16 (step 628). Then show first form in collection (step 630).

Figure 16:
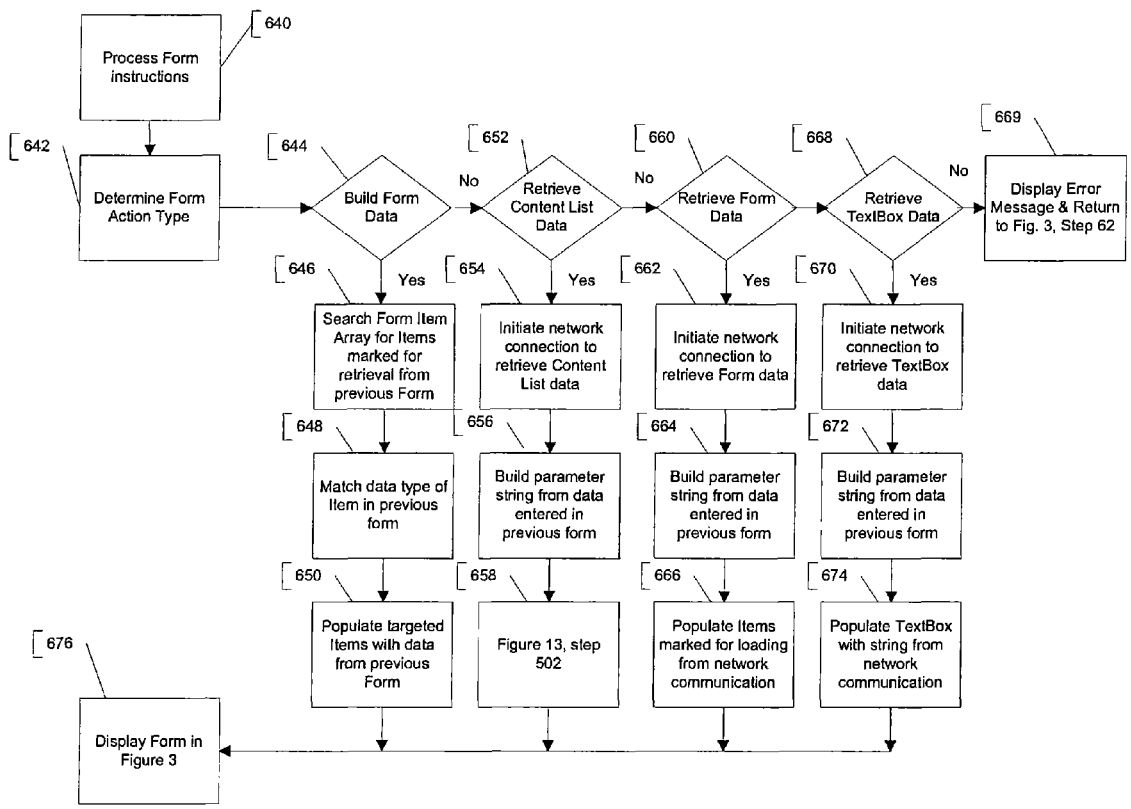
FIG. 16 is a flow diagram of the process for populating forms with data either by building it from data entered by the user or retrieving data from the service for display on the forms on the mobile networked device.

FIG. 16 is a flow diagram of the process for populating forms with data either by building it from data entered by the user or retrieving data from the Service for display on the forms on the mobile networked device.

The instructions in the form object are used to determine which method to use to populate data on the form (steps 640 and 642). An indicator in the instructions is used to determine the method used. If it indicates "Build form Data" (step 644), then the form item array is searched for items marked for retrieval from the previous form (step 646). The data types are matched or converted (step 648) and the form items are populated with the data (step 650). Control is then passed to FIG. 3.

If the indicator is set to "Retrieve Content List Data" (step 652), then a network connection is established to retrieve the Content List data (step 654) and a parameter list is built from data in items marked in the form item array as parameters (step 656). Control is then passed to FIG. 13, step 502 (step 658). Control is then passed to FIG. 3.

If the indicator is set to "Retrieve form Data" (step 660), then a network connection is established to retrieve the form data (step 662) and a parameter list is built from data in items marked in the form item array as parameters (step 664). Items marked for loading in the form item array and then loaded in the order that the data is returned (step 666). Control is then passed to FIG. 3.

Figure 17:
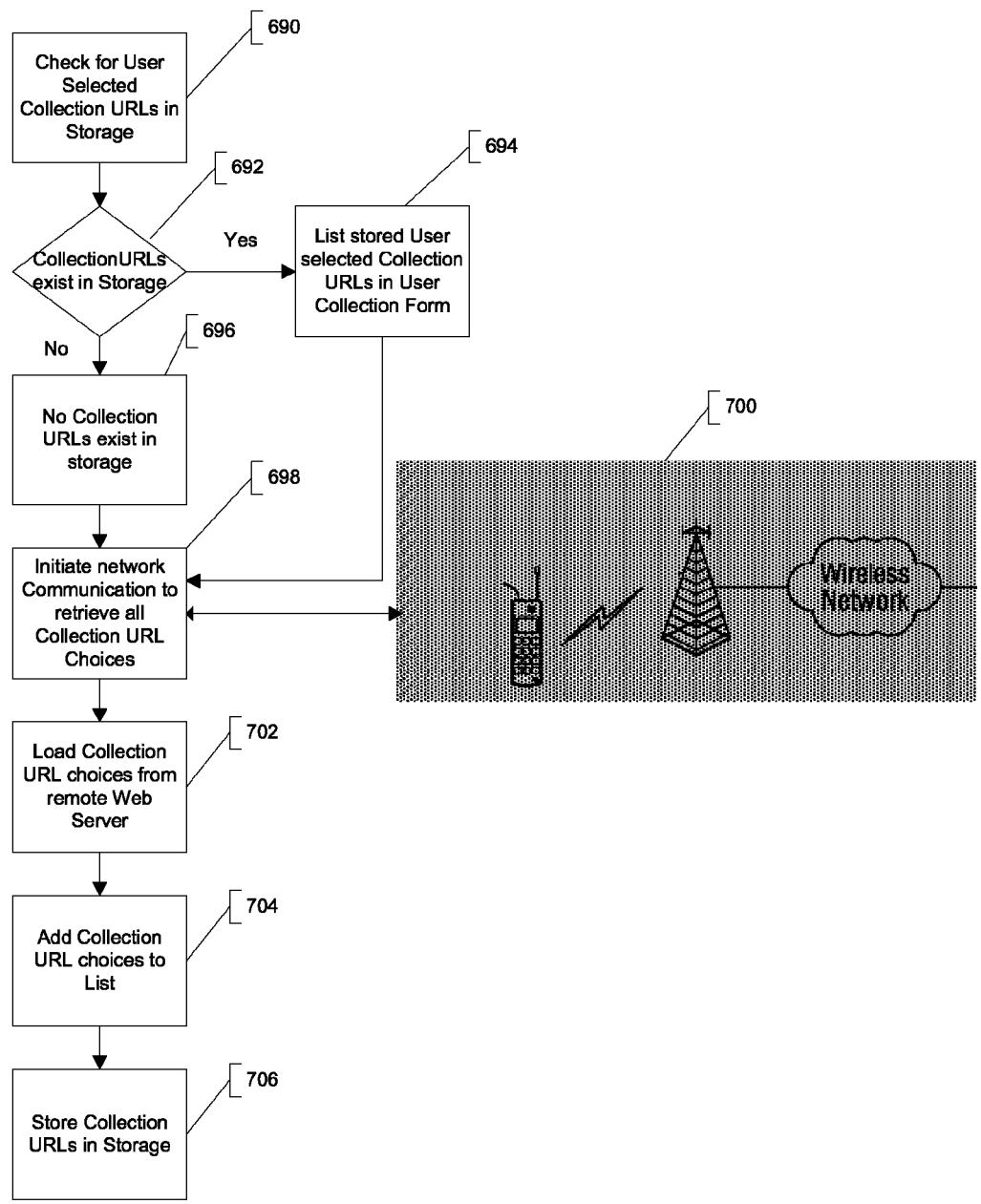
FIG. 17 is a flow diagram of the process for retrieving new form URLs from the service for display and storage on the mobile networked device.

FIG. 17 is a flow diagram of the process for retrieving new form URLs from the Service for display and storage on the mobile networked device. Check for user collections in storage on the device (steps 690 and 692). If collection URLs exist in storage, then list user selected URLs in the user collection form (step 694). If collection URLs do not exist in storage (step 696), then initiate a network communication to retrieve all collection URLs (step 698 and 700). Then load the collection form with choices retrieved over the network connection (steps 702 and 704) and then store the URLs in storage (step 706).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method to present variable format and information on a mobile networked device as a service to a user of said mobile networked device, comprising:

(1) compiling into binary code capability to present forms, items and menu commands behavior, in combination with network communication and a listener that waits on user interface events, wherein said capability to present forms, items and menu commands behavior translates to similar objects in programming languages, said forms refer to an area on the mobile networked device screen for display of information, said items refer to a display container for content on said forms; and said menu commands refer to application navigation;

(2) subsequent to step (1), loading said compiled binary code on said mobile networked device;

(3) subsequent to step (2), running said compiled binary code loaded on said mobile networked device;

(4) subsequent to step (3), requesting and receiving instructions, said instructions being other than compiled code, browser pages or scripting language and characterized as non-compiled code instructions, over a network by said compiled binary loaded and running on said mobile networked device;

(5) subsequent to step (4), presenting variable format and information by said non-compiled code instructions received in step (4) triggering execution of selected said capability in said loaded and running compiled binary code, wherein a) to present variable format and information requires at least one of said non-compiled code instructions to trigger at least one said capability in said compiled binary code loaded and running on said mobile networked device, and b) said non-compiled code instructions are ordered to constitute a collection of said non-compiled code instructions, wherein the combination, instantiation and presentation of said non-compiled code instructions is ordered to trigger said capability in said compiled binary code loaded and running on said mobile networked device to present variable format and information; and (6) subsequent to step (5), presenting different variable format and information by new said non-compiled code instructions requested and received by said compiled binary code loaded and running on said mobile networked device using step (4) triggering different capability in said compiled binary code loaded and running on said mobile networked device as in step (5), without having to recompile the code, download new code, or reprogram said mobile networked device, and without the user having to download a new compiled application.

2. The method of claim 1, further comprising making changes to said at least one of said variable format and information by changing said not compiled code instructions to trigger different said capability in said compiled binary code loaded and running on said mobile networked device, wherein said capability includes at least one of placement, appearance, behavior, logic, format, user interaction behavior, input validation and video; thus not requiring said downloading new code; recompile the code; reprogram said mobile networked device; or download a new compiled application for every desired change in said variable format and information.

3. The method of claim 2, further comprising, programming a server to store said non-compiled code instructions to present variable format and information on said mobile networked device, wherein:
   i) said server responds to requests from said compiled computer code on said mobile networked device to send said stored non-compiled code instructions as a collection of non-compiled code instructions; and
   ii) detailed in said non-compiled code instructions is the location of informational content to be displayed by said capability in said compiled binary code.

4. The method of claim 3, further comprising programming a browser or compiled program to enable assembly of said non-compiled code instructions and to send said assembly of said non-compiled code instructions to said server for storage.

5. The method of claim 4, further comprising an entity providing said programmed browser or compiled program and said assembly of said non-compiled code instructions as a service to users of said mobile networked device.

6. The method of claim 5, wherein utilization of said service provided by said entity relieves said entity from the burden of said recompile the code, download new code, or reprogram said mobile networked device, and without the user having to download a new compiled application to said mobile networked device when a change is desired in said variable format and information which may appear as advertising, forms or other informational content to customers who are said users of said mobile networked device.

7. The method of claim 6, further comprising: said user of said mobile networked device utilizing said service from a plurality of said entities; and storing the URL addresses of said servers on said mobile networked device of said user.

8. The method of claim 7, further comprising sending to said user said collection of non-compiled code instructions based upon geographical locations determined by GPS on said mobile networked device.

9. The method of claim 1, wherein said received non-compiled code instructions are in the form of integers, characters or bitmasks in a text file.

10. The method of claim 8, further comprising programming said compiled computer code to collect interaction data regarding said user with said at least one of said variable format and information; and transferring said interaction data to said server.

11. The method of claim 10, wherein said interaction data triggers said at least one capability in said compiled binary code loaded and running on said mobile networked device to affect said variable format and information.

12. The method of claim 11, further comprising using said interaction data to redirect said user to web pages on web servers of said entity in the browser on said mobile networked device.

13. The method of claim 12, wherein said entity benefits from said interaction data by being able to identify interests of said user in at least one of the products and services offered by said entity, thus enabling said entity to target said variable format and information to said user of said service on said mobile networked device.

14. A mobile networked device, to present variable format and information as a service to a user of said mobile networked device, the mobile networked device comprising a device configured to:
   (1) compile into binary code capability to present forms, items and menu commands behavior, in combination with network communication and a listener that waits on user interface events, wherein said capability to present forms, items and menu commands behavior translates to similar objects in programming languages, said forms refer to an area on the mobile networked device screen for display of information, said items refer to a display container for content on said forms; and said menu commands refer to application navigation;
   (2) subsequently load said compiled binary code on said mobile networked device;
   (3) subsequently run said compiled binary code loaded on said mobile networked device;
   (4) subsequently request and receive instructions, said instructions being other than compiled code, browser pages or scripting language and characterized as non-compiled code instructions, over a network by said compiled binary code loaded and running on said mobile networked device;
   (5) subsequently present variable format and information by said non-compiled code instructions triggering execution of selected said capability in said compiled binary code loaded and running on said mobile networked, wherein
      a) to present variable format and information requires at least one of said non-compiled instructions to trigger at least one said capability in said compiled binary code loaded and running on said mobile networked device, and
      b) said non-compiled code instructions are ordered to constitute a collection of said non-compiled code instructions, wherein the combination, instantiation and presentation of said non-compiled code instructions is ordered to trigger said capability in said compiled binary code loaded and running on said mobile networked device to said present variable format and information; and
   (6) subsequently present different variable format and information by new said non-compiled code instructions requested and received by said compiled binary code loaded and running on said mobile networked device, triggering different capability in said compiled binary code loaded and running on said mobile networked device, without having to recompile the code, download new code, or reprogram said mobile networked device, and without the user having to download a new compiled application.

15. The mobile networked device of claim 14, wherein said device is configured to make changes to said at least one of said variable format and information by changing said non-compiled code instructions to trigger different said capability in said compiled binary code loaded and running on said mobile networked device, wherein said capability includes at least one of placement, appearance, behavior, logic, format, user interaction behavior, input validation and video; thus not requiring said downloading new code; recompile the code; reprogram said mobile networked device; or download a new compiled application for a desired change in said variable format and information.

16. The mobile networked device of claim 14, in combination with a server to store said non-compiled code instructions to present variable format and information on said mobile networked device, wherein:
  i) said server responds to requests from said compiled computer code on said mobile networked device to send said stored non-compiled code instructions as a collection of non-compiled code instructions; and
  ii) detailed in said non-compiled code instructions is the location of informational content to be displayed by said capability in said compiled binary code loaded and running on said mobile networked device.

17. The mobile networked device of claim 14, further comprising a browser or compiled application programmed to enable the assembly of said non-compiled code instructions and to send said assembly of said non-compiled code instructions to said server for storage.

18. The mobile networked device of claim 17, in combination with an entity providing said programmed browser or compiled application and said assembly of said non-compiled code instructions as a service to users of said mobile networked device.

19. The combination of claim 18, wherein utilization of said service provided by said entity relieves said entity from the burden of said recompile the code, download new code, or reprogram said mobile networked device, and without the user having to download a new compiled application to said mobile networked device when a change is desired in said variable format and information which may appear as advertising, games, forms, items, user interaction and other informational content to customers who are said users of said mobile networked devices.

20. A server for operation with a mobile networked device via a network, said mobile networked device configured to present variable format and information as a service to a user of said mobile networked device, said server configured to
  (1) compile into binary code capability to present forms, items and menu commands behavior, in combination with network communication and a listener that waits on user interface events, wherein said capability to present forms, items and menu commands behavior translates to similar objects in programming languages, said forms refer to an area on the mobile networked device screen for display of information, said items refer to a display container for content on said forms; said menu commands refer to application navigation; and compile into binary code on said server capability to interact with said compiled binary code on said mobile networked device;
  (2) subsequently load said compiled binary code on said mobile networked device;
  (3) subsequently run said compiled binary code loaded on said mobile networked device;
  (4) subsequently request and receive instructions, said instructions being other than compiled code, browser pages or scripting language and characterized as non-compiled code instructions, from said server running said capability code to interact over a network by said compiled binary code loaded and running on said mobile networked device;
  (5) subsequently present variable format and information by said non-compiled code instructions triggering execution of selected said capability in said compiled binary code loaded and running on said mobile networked device, wherein:
    a) to present variable format and information requires at least one of said non-compiled instructions to trigger at least one said capability in said compiled binary code loaded and running on said mobile networked device, and
    b) said non-compiled code instructions are ordered to constitute a collection of said non-compiled code instructions, wherein the combination, instantiation and presentation of said non-compiled code instructions is ordered to trigger said capability in said compiled binary code loaded and running on said mobile networked device to present variable format and information; and
  (6) subsequently present different variable format and information by new said non-compiled code instructions requested and received from said server by said compiled binary code loaded and running on said mobile networked device triggering different capability in said compiled binary code loaded and running on said mobile networked device, without having to recompile the code, download new code, or reprogram said mobile networked device, and without the user having to download a new compiled application.

21. The server of claim 20, wherein said server facilitates making changes to said at least one of said variable format and information by changing said non-compiled code instructions sent from said server to said compiled binary code on said mobile networked device to trigger different said capability in said compiled binary code loaded and running on said mobile networked device, wherein said capability code includes at least one of placement, appearance, behavior, logic, format, user interaction behavior, input validation and video; thus not requiring said downloading new code; recompile the code; reprogram said mobile networked device; or download a new compiled application for every desired change in said variable format and information.

22. The server of claim 21, configured for communication with a browser or compiled application, said browser or compiled application having program code to generate an assembly of said non-compiled code instructions and to send said assembly of said non-compiled code instructions to said server for storage.

23. The server of claim 22 wherein the combination with said mobile networked device, said browser or compiled application and said assembly of said non-compiled code instructions is offered by an entity as a service to users of said browser and compiled application and said mobile networked device.

24. The server of claim 23, wherein utilization of said service provided by said entity relieves said entity and said users from said recompile the code, download new code, or reprogram said mobile networked device, and without the user having to download a new compiled application to said mobile networked device when a change is desired in said variable format and information which may appear as said advertising, games, forms, items, user interaction and other informational content to customers who are said users of said mobile networked devices.

25. The method of claim 1, wherein said compiling Step 1 comprises said compiling into binary code one of a subset of said capability to present forms, items and menu commands behavior capability or all said capability to present forms, items and menu commands behavior capability available in a programming language, wherein said capability code includes said at least one of placement, appearance, behavior, format, user interaction behavior, input validation and video; and said code can be a standalone application, embedded in an application, a browser plugin or a background thread running on startup of the mobile networked device.

* * * * *